(12) United States Patent
Astle et al.

(10) Patent No.: US 10,940,636 B2
(45) Date of Patent: Mar. 9, 2021

(54) SHIP FLAT BLOW-MOLDED TUNNEL

(71) Applicant: Lifetime Products, Inc., Clearfield, UT (US)

(72) Inventors: Robert A. Astle, Kaysville, UT (US); Danny Green, Layton, UT (US); Jacob Kearl, Willard, UT (US); Eric Olsen, West Haven, UT (US)

(73) Assignee: Lifetime Products, Inc., Clearfield, UT (US)

( * ) Notice: Subject to any disclaimer, the term of this patent is extended or adjusted under 35 U.S.C. 154(b) by 276 days.

(21) Appl. No.: 15/660,448

(22) Filed: Jul. 26, 2017

(65) Prior Publication Data

US 2018/0029287 A1  Feb. 1, 2018

Related U.S. Application Data

(60) Provisional application No. 62/367,996, filed on Jul. 28, 2016.

(51) Int. Cl.
*B29C 59/02* (2006.01)
*B32B 3/20* (2006.01)
*B65D 1/40* (2006.01)
*B32B 1/08* (2006.01)
*B29C 49/00* (2006.01)

(52) U.S. Cl.
CPC ........ *B29C 59/021* (2013.01); *B29C 49/0031* (2013.01); *B29C 49/0078* (2013.01); *B32B 1/08* (2013.01); *B32B 3/20* (2013.01); *B65D 1/40* (2013.01); *Y10T 428/2975* (2015.01)

(58) Field of Classification Search
CPC ............ B29C 49/0031; B29C 49/0078; B29C 59/021; B32B 1/08; B32B 3/20; B65D 1/40; Y10T 428/2975
See application file for complete search history.

(56) References Cited

U.S. PATENT DOCUMENTS

| | | |
|---|---|---|
| 2,841,396 A | 7/1958 | Foss |
| 3,045,961 A | 7/1962 | Cygan |
| 4,270,748 A | 6/1981 | Ray |
| 4,299,171 A | 11/1981 | Larson |
| 4,932,648 A | 6/1990 | Ahrens |
| 5,427,574 A | 6/1995 | Donnelly-Weide |
| 5,728,005 A | 3/1998 | Rothbard |
| 5,860,867 A | 1/1999 | Van Deusen |

(Continued)

OTHER PUBLICATIONS

U.S. Appl. No. 61/914,857, filed Dec. 11, 2013, VanDyke et al.
U.S. Appl. No. 61/914,874, filed Dec. 11, 2013, VanDyke et al.
International Search Report and Written Opinion of PCT/US2014/069836 dated Mar. 2, 2015.

(Continued)

*Primary Examiner* — Yan Lan
(74) *Attorney, Agent, or Firm* — Workman Nydegger

(57) ABSTRACT

One example of a flexible structure includes an elongate body having a first end and a second end, and the first end is configured to be releasably connected to the second end. As well, one or more living hinges are positioned in the elongate body between the first end and the second end, and the one or more living hinges are configured and arranged to enable the first end and second end to be moved toward each other. Finally, the flexible structure is configured to alternatively assume at least a flat state and an assembled state, and in the assembled state, the first end of the elongate body is connected to the second end of the elongate body.

21 Claims, 25 Drawing Sheets

(56) References Cited

U.S. PATENT DOCUMENTS

| | | | |
|---|---|---|---|
| 5,941,041 A | 8/1999 | Robinson | |
| 6,910,304 B2 * | 6/2005 | Warren | B64G 1/222 52/108 |
| 6,955,204 B1 | 10/2005 | Gilbert | |
| D575,840 S | 8/2008 | Sammann et al. | |
| D601,220 S | 9/2009 | Sammann et al. | |
| 7,581,547 B2 * | 9/2009 | Pena | A45D 8/00 132/275 |
| 7,662,045 B2 | 2/2010 | Sammann et al. | |
| 9,427,670 B2 | 8/2016 | VanDyke et al. | |
| 10,265,630 B2 | 4/2019 | VanDyke et al. | |
| 2005/0210761 A1 | 9/2005 | Mower | |
| 2006/0150569 A1 | 7/2006 | Mettler | |
| 2007/0078014 A1 | 4/2007 | Nye et al. | |
| 2011/0045250 A1 | 2/2011 | De Zen | |

OTHER PUBLICATIONS

International Preliminary Report on Patentability of PCT/US2014/069836 dated Jun. 23, 2016.
U.S. Appl. No. 14/565,196, Aug. 14, 2015, Office Action.
U.S. Appl. No. 14/565,196, Feb. 19, 2016, Office Action.
U.S. Appl. No. 14/565,196, May 6, 2016, Notice of Allowance.
U.S. Appl. No. 15/232,133, Mar. 14, 2017, Office Action.
U.S. Appl. No. 15/232,133, Sep. 20, 2017, Final Office Action.
U.S. Appl. No. 15/232,133, Jan. 25, 2018, Office Action.
U.S. Appl. No. 15/232,133, Aug. 28, 2018, Final Office Action.
U.S. Appl. No. 15/232,133, Dec. 17, 2018, Notice of Allowance.

* cited by examiner

SHIP FLAT BLOW-MOLDED TUNNEL

RELATED APPLICATIONS

This application hereby claims priority to, and the benefit of, U.S. Provisional Patent Application Ser. No. 62/367,996, entitled SHIP FLAT BLOW-MOLDED TUNNEL, and filed Jul. 28, 2016. All of the aforementioned applications are incorporated herein in their respective entireties by this reference.

BACKGROUND

The present disclosure is generally concerned with playground equipment. More specifically, at least some of the disclosed embodiments concern a structure that can be selectively configured to assume various alternative forms, examples of which include the form of a tunnel, and the form of a flat panel. The structure, and portions of the structure, can be blow-molded, although that is not required.

Thus, embodiments of the invention may enable a relative improvement in the efficiency with which playground, and other, equipment and structures can be packaged and shipped. Packing and shipping efficiencies may, in turn, contribute to an overall lower cost per unit.

BRIEF SUMMARY OF SOME ASPECTS OF THE DISCLOSURE

It should be noted that the embodiments disclosed herein do not constitute an exhaustive summary of all possible embodiments, nor does this brief summary constitute an exhaustive list of all aspects of any particular embodiment(s). Rather, this brief summary simply presents selected aspects of some example embodiments. It should be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular technical effect(s) or solution(s).

A. Example Embodiments of Flexible Structures and Constituent Elements

Disclosed embodiments are generally concerned with flexible structures that can be laid out flat, or substantially flat, for efficiency in packaging and shipping. The flexible structures can also be rolled up, and/or otherwise manipulated, and the two ends of a flexible structure can be releasably connected together so that the flexible structure assumes another configuration, such as a tunnel portion for example. As well, multiple tunnel portions can be joined together to form a longer tunnel that can be used as stand-alone playground equipment, or can be included as part of a playset. In some embodiments where multiple tunnel portions are used to construct a tunnel, the individual tunnel portions can be similar or identical to each other, while in other embodiments where multiple tunnel portions are used to construct a tunnel, at least one tunnel portion is different from another tunnel portion.

The foregoing aspects are presented by way of example and are not intended to limit the scope of the invention in any way. Finally, note that while example embodiments of a flexible structure may be referred to herein as tunnel portions, such embodiments are not necessarily confined for use in forming a tunnel, and may accordingly find application in various other structures as well. Thus, the scope of the invention is not limited to use of the disclosed structures in the creation of tunnels.

Consistent with the foregoing examples, embodiments of a flexible structure, such as a tunnel portion for example, within the scope of this disclosure may include any one or more of the following elements, and features of elements, in any combination—it should be understood that the tunnel portions referred to herein are example implementations of a flexible structure and, as such, reference herein to tunnel portions is for the purposes of illustration only and is not intended to limit the scope of the invention in any way: a flexible structure, such as a tunnel portion, including two, or any number greater than two, hollow portions extending laterally and connected to each other by way of respective integral living hinges interposed between successive hollow portions; a flexible structure, such as a tunnel portion, configured to assume a polygonal shape or a circular shape and including a plurality of hollow portions extending laterally and connected to each other by way of respective integral living hinges interposed between successive hollow portions; a flexible structure, such as a tunnel portion, configured to assume a circular shape, half-round shape, raised half-round shape, triangular shape, rectangular shape, or a polygonal shape and including a plurality of hollow portions extending laterally and connected to each other by way of respective integral living hinges interposed between successive hollow portions, and one, some, or all, of the hollow portions is curved or flat; a flexible structure, such as a tunnel portion, having an elongate configuration whose length is greater than its width; a plurality of living hinges disposed laterally along a portion of the length of a tunnel portion; a tunnel portion in the form of a unitary one-piece structure and substantially comprising plastic; a tunnel portion formed by a blow-molding process; a tunnel portion including a plurality of curved portions and/or a plurality of flat portions extending laterally across a width of the tunnel portion; a tunnel portion including a plurality of integral hollow portions extending laterally; a tunnel portion including a plurality of curved or flat hollow portions extending laterally and connected to each other by way of respective integral living hinges disposed between successive hollow portions; a tunnel portion including a plurality of hollow portions extending laterally; a plurality of hollow portions having, with respect to each other, a non-uniform length and/or width; a pair of hollow portions extending laterally across a portion of a width of a tunnel portion and cooperating with each other to define an opening in the tunnel portion; a tunnel portion having first and second sides and including, on each side, a plurality of hollow portions extending laterally; a tunnel portion having first and second ends that are releasably connectable to each other; and, a tunnel portion having a lengthwise edge that is releasably connectable to a lengthwise edge of another such tunnel portion; and, a tunnel portion including a laterally extending hollow portion that includes a tack off.

B. Example Embodiments

Following is a non-exclusive list of some example embodiments of a flexible structure, any of which can take the form of a tunnel portion for example, within the scope of the invention. It should be understood that aspects of the various embodiments disclosed herein may be combined in other ways to define yet other embodiments.

In a first example embodiment, a flexible structure has first and second ends that are releasably connectable to each other.

In a second example embodiment, a flexible structure has a side edge that is releasably connectable to a side edge of another flexible structure.

In a third example embodiment, a flexible structure has first and second ends that are releasably connectable to each other, and the flexible structure further includes a side edge that is releasably connectable to a side edge of another flexible structure.

In a fourth example embodiment, a flexible structure includes a plurality of laterally extending portions that are hollow and are separated from each other by a respective living hinge disposed between successive laterally extending portions.

In a fifth example embodiment, a flexible structure includes a plurality of laterally extending portions that are hollow and are separated from each other by a respective living hinge disposed between successive laterally extending portions, and the laterally extending portions have a curved, or flat, cross-sectional shape.

In a sixth example embodiment, a flexible structure has first and second ends that are releasably connectable to each other, and the flexible structure can be laid out flat when the first and second ends are not connected to each other.

In a seventh example embodiment, a flexible structure has a first side that includes a plurality of laterally extending portions that are hollow and are separated from each other by respective living hinges, and the tunnel has a second side that includes a plurality of laterally extending portions that are hollow and separated from each other by respective living hinges.

In an eighth example embodiment, a flexible structure has a first side that includes a plurality of laterally extending portions that are hollow and are separated from each other by a respective living hinge disposed between successive laterally extending portions, and the tunnel has a second side that includes a plurality of laterally extending portions that are hollow, and the flexible structure includes one or more openings that extend through the first side and the second side.

Any of the disclosed example embodiments, including those noted above, can be plastic and may take the form of a unitary, single-piece structure formed by a blow-molding, or other, process. As such, the living hinges and laterally extending hollow portions may be integral to the flexible structure, and any disclosed embodiment of a flexible structure may take the form of a unitary, single-piece structure.

Any of the aforementioned example embodiments can be included as an element of a play set for a playground. The play set, including one or more flexible structures, can be packaged in a partly, or completely, unassembled form.

Finally, any embodiment of a tunnel portion or other flexible structure that is constructed at least partly of blow-molded plastic may include one or more elements that have an interior that is partly, or completely, hollow. Such embodiments may also include, disposed in the interior, one or more depressions, sometimes referred to as "tack offs." In such embodiments, these tack offs may be integrally formed as part of a unitary, single-piece structure during a blow-molding or other forming process. The depressions may extend from a first surface, such as a first interior surface of the tunnel portion or other flexible structure, towards a second surface, such as a second interior surface of the tunnel portion or other flexible structure. The ends of one or more depressions may contact or engage the second surface so as to form a tack off, or the ends of one or more of the depressions may be spaced apart from the second surface by a distance. In some instances, one or more depressions on a first interior surface may be substantially aligned with corresponding depressions on a second interior surface, and one or more depressions on the first interior surface may contact one or more corresponding depressions on the second interior surface so as to form a tack off or, alternatively, one or more depressions on the first interior surface may be spaced apart from corresponding depressions on the second interior surface. In still other instances, depressions that contact each other and depressions that are spaced apart from each other may both be present in a tunnel portion or other structure. The depressions may be sized and configured to strengthen and/or reinforce a portion of the tunnel portion or other structure.

BRIEF DESCRIPTION OF THE DRAWINGS

The appended drawings contain figures of some example embodiments to further clarify various aspects of the present disclosure. It will be appreciated that these drawings depict only some embodiments of the disclosure and are not intended to limit its scope in any way. The disclosure will be described and explained with additional specificity and detail through the use of the accompanying drawings in which.

DETAILED DESCRIPTION OF SOME EXAMPLE EMBODIMENTS

Figure 1:
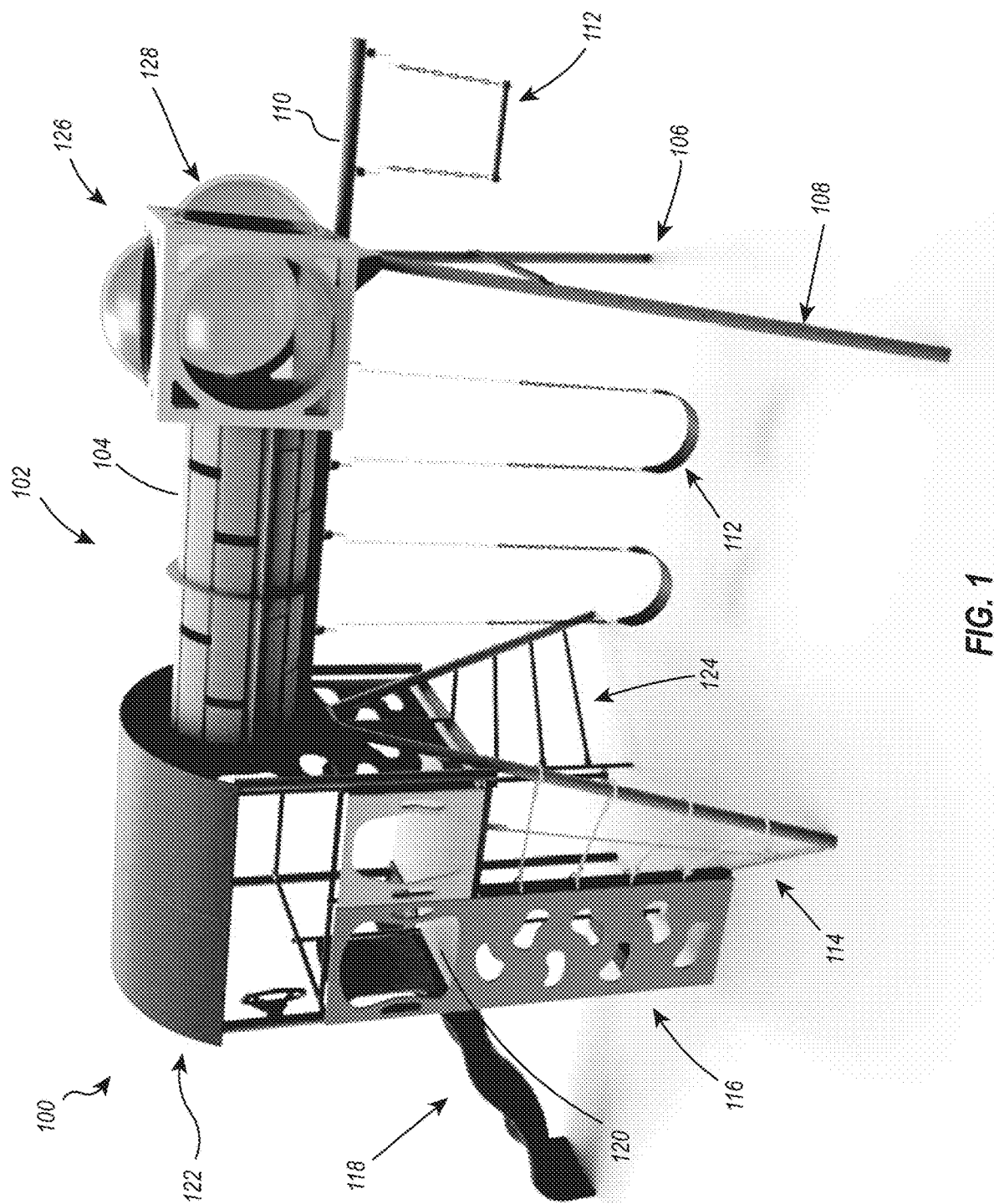
FIG. 1 is a front perspective view that discloses an example tunnel configuration, and other elements of a play set with which the tunnel can be employed.

The present disclosure is generally concerned with flexible structures, example embodiments of which can take the form of unified, single-piece structures produced by processes such as, but not limited to, blow-molding, and which may include one or more living hinges that enable the flexible structure to be flexed, bent, and/or otherwise manipulated, to assume a variety of alternative configurations. At least some embodiments of the flexible structures include one or more hollow portions, which may take the general form of a box beam for example having a generally rectangular cross-section that may provide strength and/or rigidity to non-flexible portions of the flexible structures.

In some particular example embodiments, a flexible structure has two ends that can be releasably connected to each other to form a tunnel portion. An edge of such a tunnel portion can be releasably connected to an edge of another tunnel portion to form a tunnel, or a part of a tunnel, such as may be used on a playground.

A. General Aspects of Some Example Embodiments

In general, flexible structures such as tunnel portions, and associated components disclosed herein, may be constructed with a variety of components and materials including, but not limited to, plastic (including injection-molded, blow-molded, roto-molded, and twin sheet formed plastic structures and elements) including polycarbonates, composites, metals, and combinations of any of the foregoing. The tunnel portions and other flexible structures can take the form of unitary, single-piece structures.

Example properties of plastics that can be used in various embodiments of the invention are hard, rigid, semi-rigid, soft, low friction, or high friction. One particular example of a plastic is high-density polyethylene (HDPE), although other plastics can also be used. Plastic fasteners can also be used to attach tunnel portions to each other and/or to attach one end of a tunnel portion to the other end of a tunnel portion. Some embodiments of flexible structures may not require the use of fasteners in order to retain the flexible structure in a particular configuration other than a ship flat configuration.

Suitable metals, such as for fasteners to attach tunnel portions to each other and/or to attach one end of a tunnel portion to the other end of a tunnel portion, and/for constructing elements such as the frame of a play set, may include steel, aluminum, and aluminum alloys. However, the skilled person will understand that a variety of other metals may be employed as well and the scope of the invention is not limited to the foregoing examples. Where metal is employed in the construction of a component, such as a component of a playset for a playground for example, the metal elements may take one or more forms including, but not limited to, box shapes such as square tube and rectangular tube, oval tube, round tube, pipe, angles, flat bar, I-shapes, T-shapes, L-shapes, and combinations and portions of any of the foregoing.

Depending upon the material(s) employed in the construction of the playground equipment, a variety of methods and components may be used to connect, releasably or permanently, one or more tunnel portions to each other and/or to other structures. For example, the various elements of playground equipment or component within the scope of this disclosure may be attached to each other mechanically by way of plastic and/or metal fasteners such as bolts, screws, pins, and rivets, for example. At least some embodiments of a tunnel portion can be connected to one or more other tunnel portions without the use of fasteners such as threaded fasteners (e.g., screws, bolts, screw nails), nails, or rivets. As well, one end of a tunnel portion can be connected to another end of that tunnel portion without the use of fasteners such as threaded fasteners (e.g., screws, bolts, screw nails), nails, or rivets.

For example, snap-fit or other releasable locking mechanisms can be used to connect tunnel portions to each other and/or to connect one end of a tunnel portion to the other end of that tunnel portion. In still other embodiments, a tunnel portion can be configured to be permanently locked to another tunnel portion and/or the tunnel portion can be configured so that the first end of the tunnel portion can be permanently locked to the second end of that tunnel portion. In some cases, a tunnel portion can be configured so that it is only connectable on one side to another tunnel portion, and in still other cases, a tunnel portion can be configured so that neither side of that tunnel portion is connectable to another tunnel portion. In still other cases, both sides of a tunnel portion can be connected to respective tunnel portions.

Surface treatments and textures may also be applied to portions of the tunnel portions. For example, a tunnel portion may be relatively smooth on part of one or more surfaces, while part of one or more other surfaces of that tunnel portion may be textured or treated in such a way as to provide a surface with relatively better grip and/or for esthetic purposes. No particular surface treatment, or any surface treatment, is required however.

B. Some Example Embodiments of a Play Set

Figure 2:
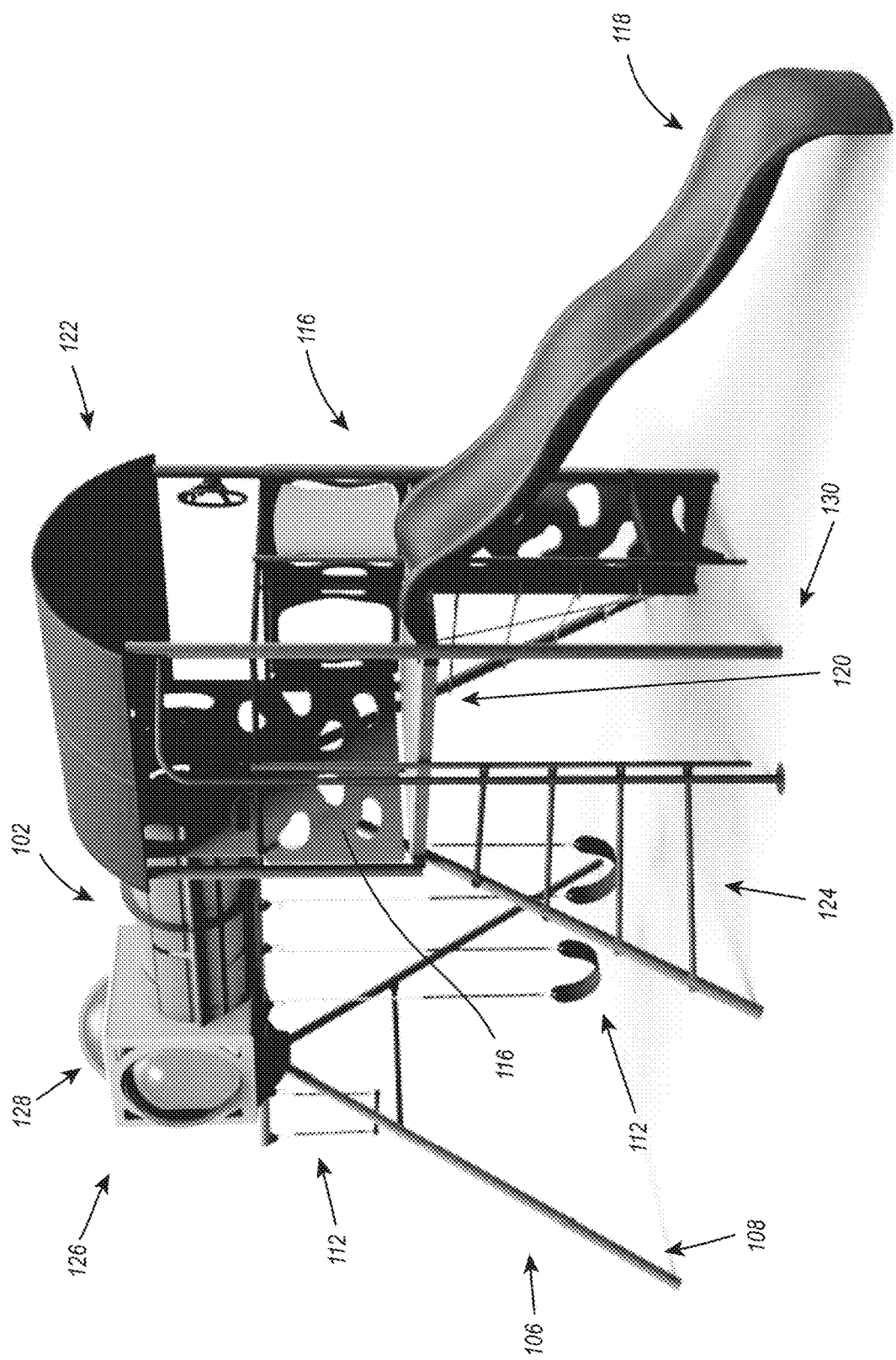
FIG. 2 is a rear perspective view that discloses an example tunnel configuration, and other elements of a play set with which the tunnel can be employed.

Directing attention now to FIGS. 1 and 2, details are provided concerning an example environment in which embodiments of flexible structures, in the form of a tunnel portion and tunnel, may be employed. As indicated, a play set 100 includes a tunnel 102 that may comprise one or more tunnel portions 104. The tunnel 102 is supported by a frame 106 that can include one or more elements such as legs 108 and a cross-bar 110. One or more swings 112 can be included that are attached to the cross-bar 110. As well, a ropes course 114, climbing wall 116, and slide 118 may be included. The illustrated example of a play set 100 also includes a platform 120, awning 122, and ladder 124. As well, the tunnel 102 may terminate at, or intersect with, an observation tower 126 that includes one or more bubble windows 128. Finally, the play set 100 can include a fireman pole 130. It should be noted that the play set 100 configuration disclosed in FIGS. 1 and 2 is presented only by way of example, and additional or alternative elements can be included in other embodiments. As well, any one or more of the elements indicated in FIGS. 1 and 2 can be omitted so as to define still other embodiments of a play set.

C. Aspects of Example Embodiments of a Tunnel Portion and Pieces

Figure 3:
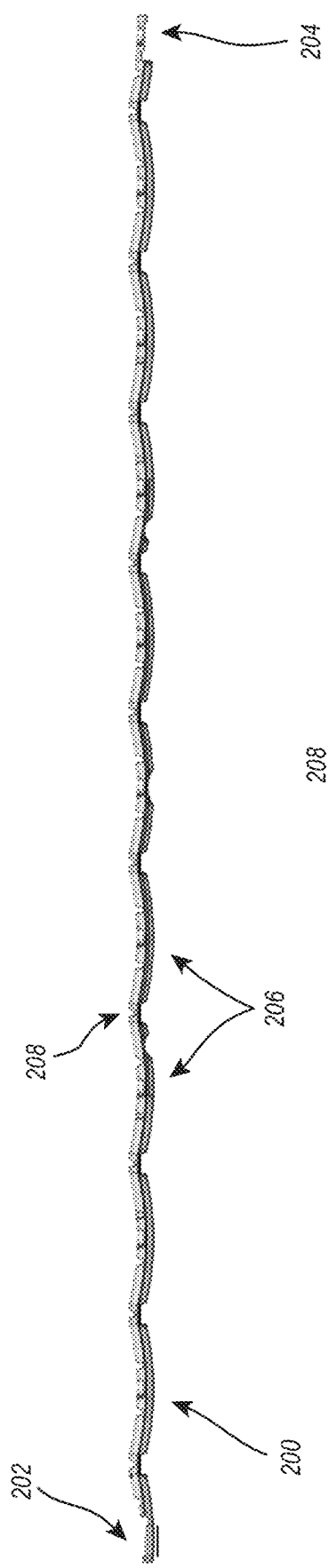
FIG. 3 is a side view of a flexible structure, in the form of a tunnel portion, in a ship flat configuration.

Turning now to FIGS. 3-11, details are provided concerning some example implementations of flexible structures such as tunnel portions, and associated tunnels. With reference first to FIG. 3, a tunnel portion 200 body is disclosed in a ship flat state or configuration. Advantageously, when the body of the tunnel portion 200 is in the configuration illustrated in FIG. 3, multiple tunnel portions 200 in the same configuration can be stacked on top of each other, thus enabling relatively more efficient packaging and shipping than if the tunnel portions 200 could not be manipulated into a ship flat configuration.

To illustrate, an example tunnel portion may have a length (L), a width (W) and a thickness (T), where L>W>T. Accordingly, when the tunnel portion is laid out flat, the tunnel portion occupies a volume V1=L×W×T. However, when the tunnel portion is in an assembled state, the tunnel portion occupies a cylindrical volume V2 that is primarily a function of L and W. In particular, L defines a circumference $2\pi r$ when the two ends of the tunnel portion are connected to each other, and it can thus further be seen that $r=L/2\pi$. Since the area A of the circle (whose circumference is defined by L)$=\pi r^2$, $A=L^2/4\pi$. Accordingly, V2=A×W, or $(L^2/4\pi)\times W$.

Substituting in some example dimensions illustrates the significant difference in volume occupied by a tunnel portion in the flat state, and the same tunnel portion in an assembled state. For example, assume L=75 inches, W=30 inches, and T=1 inches. In this case, V1 (L×W×T)=2250 inches$^3$. On the other hand, V2 (($L^2/4\pi$)×W)=13,429 inches$^3$ (the thickness T can be ignored for V2 since it is the length L that defines the overall diameter of the tunnel portion). Thus, in this example, the assembled tunnel portion occupies about 6× more volume (that is, 13,429 inches$^3$/2250 inches$^3$) than the tunnel portion in the flat state.

With continued reference to FIG. 3, the tunnel portion 200 includes a first end 202 and a second end 204 that are configured to lock, either permanently or releasably, together. The tunnel portion 200 generally comprises multiple segments 206 connected to each other by way of living hinges 208. It can be seen that the individual segments 206 may have a generally curved configuration when viewed from the perspective indicated in FIG. 3, although in other embodiments, one, some, or all of the segments 206 may have a generally flat configuration when viewed from the perspective indicated in FIG. 3.

It should be noted that as used herein, a living hinge refers to a structure that is relatively flexible and which, when connected in a hinge configuration to two other elements that may be relatively rigid, such as segments 206 for example, enables the attached rigid elements to move relative to each other by virtue of the flexibility of the living hinge. A living hinge may be relatively thinner than other portions of the flexible structure, and may be solid rather than hollow, yet thick enough to be of adequate strength to withstand manipulation of the flexible structure into various alternative configurations. As such, the living hinge may have an inner surface that defines part of an inner surface of a tunnel portion, while an outer surface of the living hinge may be positioned below an outer surface of one or more segments of the tunnel portion.

Finally, the living hinge can be integral with one or both of the relatively rigid structures, such that the living hinge and relatively rigid structures collectively take the form of a unified, single-piece structure. Such unified single-piece structures, which can be made of plastic, can be formed by any of the processes disclosed herein, including blow-molding.

Figure 4:
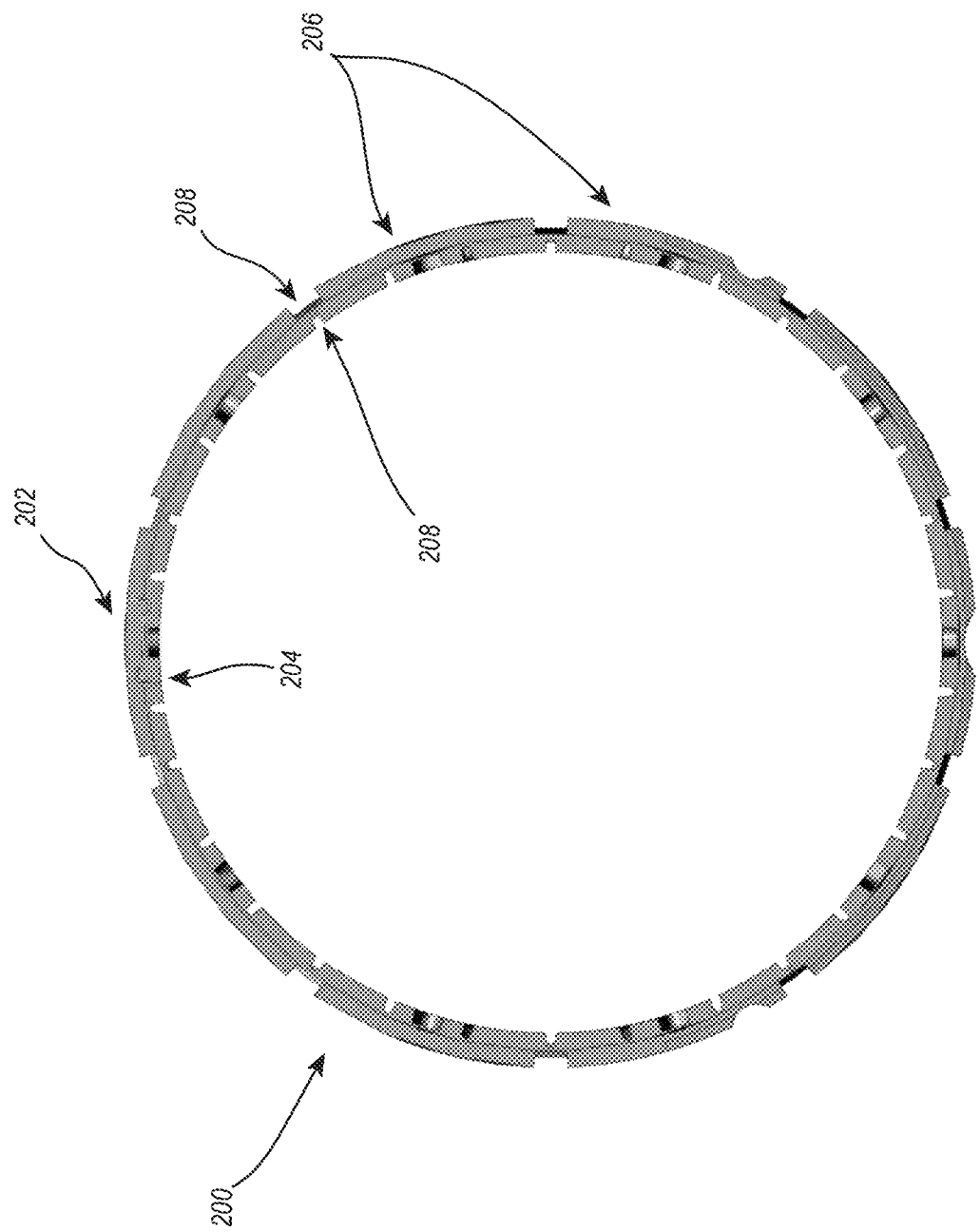
FIG. 4 is a side view of a flexible structure, in the form of a tunnel portion, in a tunnel configuration in which the ends of the tunnel portion are connected to each other.

As indicated in FIG. 4, when the first end 202 and the second end 204 of the tunnel portion 200 are connected together, the tunnel portion is in an assembled state and as such defines a generally circular portion of a tunnel. In the assembled state, the tunnel portion 200 can be connected to one or more other tunnel portions 200 to form a complete tunnel (see, e.g., tunnel 102). In other embodiments, one or more tunnel portions 200 can be configured such that, when in an assembled state, the tunnel portion defines a non-circular shape, such as a polygonal shape for example, or even a triangular shape or rectangular shape, half-round shape, or raised half-round shape. Thus, the scope of the invention is not limited to flexible structures, such as tunnel portion 200, that can be formed into a circular shape.

In some example embodiments, tunnel portions have other than a straight configuration. For example, some embodiments are directed to tunnel portions in the shape of a 'T'. Yet other example embodiments are directed to tunnel portions configured as an elbow with a bend angle of about 90 degrees. Such alternative tunnel portions could be connected with straight tunnel portions to create a maze, for example.

Figure 5:
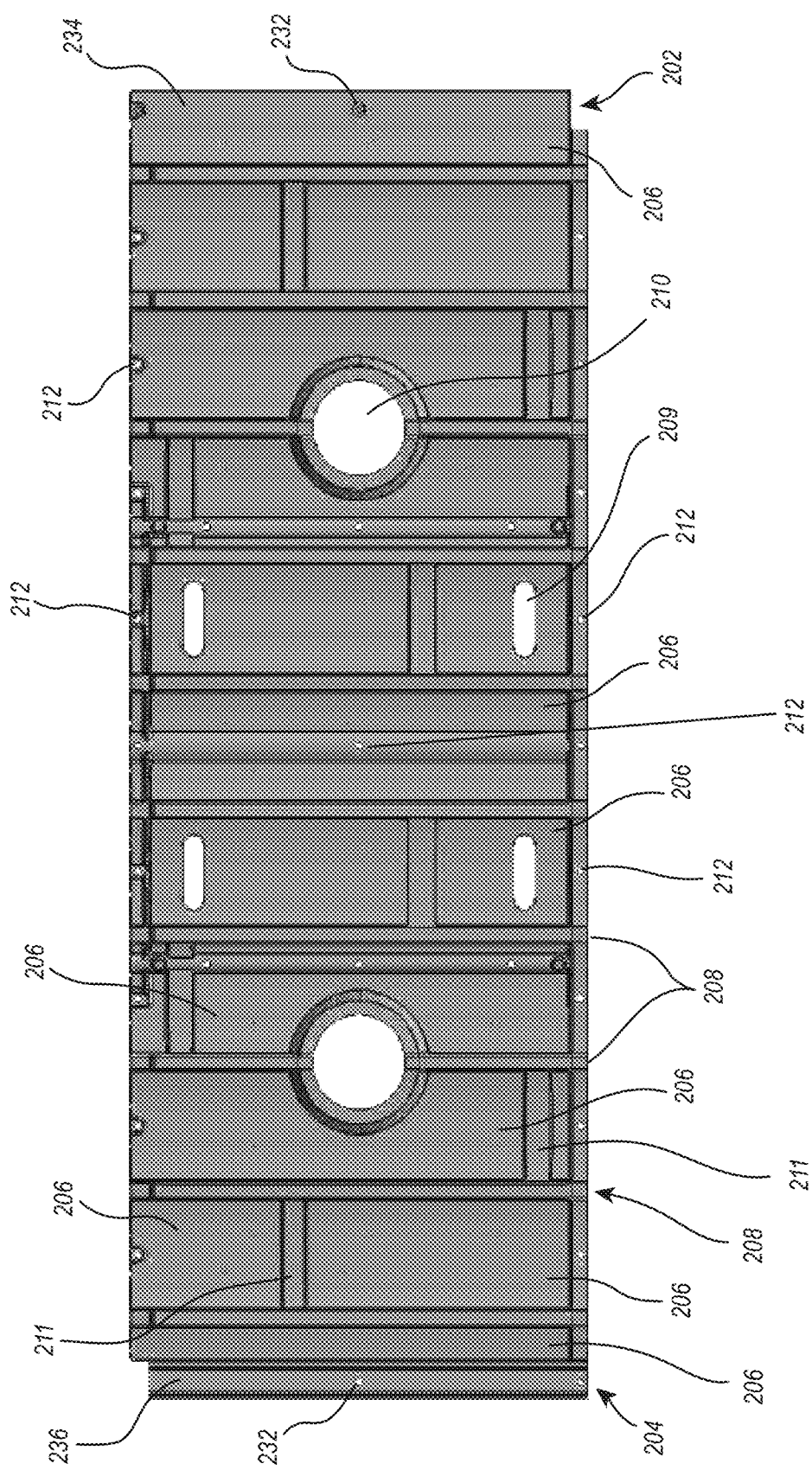
FIG. 5 is a top view of an outside of a flexible structure that is in the form of a tunnel portion.

Turning now to FIG. 5, additional details are provided concerning an example tunnel portion 200, as viewed from the top in a ship flat configuration or state. When the tunnel portion 200 is in an assembled state, such as is disclosed in FIG. 4, the elements shown in FIG. 5 are visible on the outside of the tunnel portion 200. In general, one, some, or all, of the segments 206 can take the form of laterally extending hollow portions that can be formed, for example, by a blow-molding process, or other production process disclosed herein.

The segments 206 can vary widely from each other in terms of their physical configuration, although such variation is not required and may be omitted in some embodiments. For example, and as collectively disclosed in FIG. 5, some segments 206 are longer than others, some segments 206 are wider than others, some segments 206 define openings such as openings 209 and 210, and other segments 206 do not, other segments 206 define a portion of an opening, and some segments extend less than the entire width of the tunnel portion 200. In the example of FIG. 5, most of the segments 206 have about the same width, although that is not necessarily required. Likewise, while the segments 206 disclosed in FIG. 5 are indicated as having generally rectangular shapes, that is not necessarily required, and segments having non-rectangular shapes, and shapes with one or more curves, can also be used. The segments 206 at the first end 202 and second end 204 can be relatively narrower than the other segments 206. The openings 209 can be employed as handholds by a user when entering and exiting the tunnel portion 200, such as when the tunnel portion 200 is positioned above the platform 120 for example. As well, the openings 210 can provide ventilation, and also enable a user to look from inside the tunnel portion 200 to the outside.

In some instances, two or more segments 206 can be separated laterally by a depression 211. The dimensions of these segments 206, and the depression 211, can be any desired dimensions. In other cases, a segment 206 can extend across all, or nearly all, the width of the tunnel portion 200.

As further indicated in FIG. 5, the tunnel portion 200 can include, on its lengthwise edges, one or more holes 212 that extend completely through the body of the tunnel portion 200. In general the holes 212 can be aligned with corresponding holes of another tunnel portion 200, and bolts or other fasteners, examples of which are disclosed herein, extended through the aligned holes 212 so as to connect the two tunnel portions 200 together. The hole 232 in the middle of the tunnel portion 200 at the first end 202 can accommodate a fastener (not shown) that can be used to connect the first end 202 to the second end 204 and/or to connect the tunnel portion 200 to another structure. As discussed below in connection with FIG. 11, holes 212 can also be provided to enable connection of individual pieces of a tunnel portion 200 together.

Attaching tunnel portions 200 end to end can be repeated as many times as needed to define a tunnel of a desired overall length having any number of tunnel portions 200. Thus, a tunnel may comprise, or consist of, one, two, three, four, or any number greater than four, tunnel portions. See also, the side view of tunnel portion 200 in FIG. 7. As well, one or more holes 212 can be defined in other locations of the tunnel portion 200, such as in the middle for example, to enable the tunnel portion 200 to be attached to another structure, such as part of a play set 100 for example.

Figure 6:
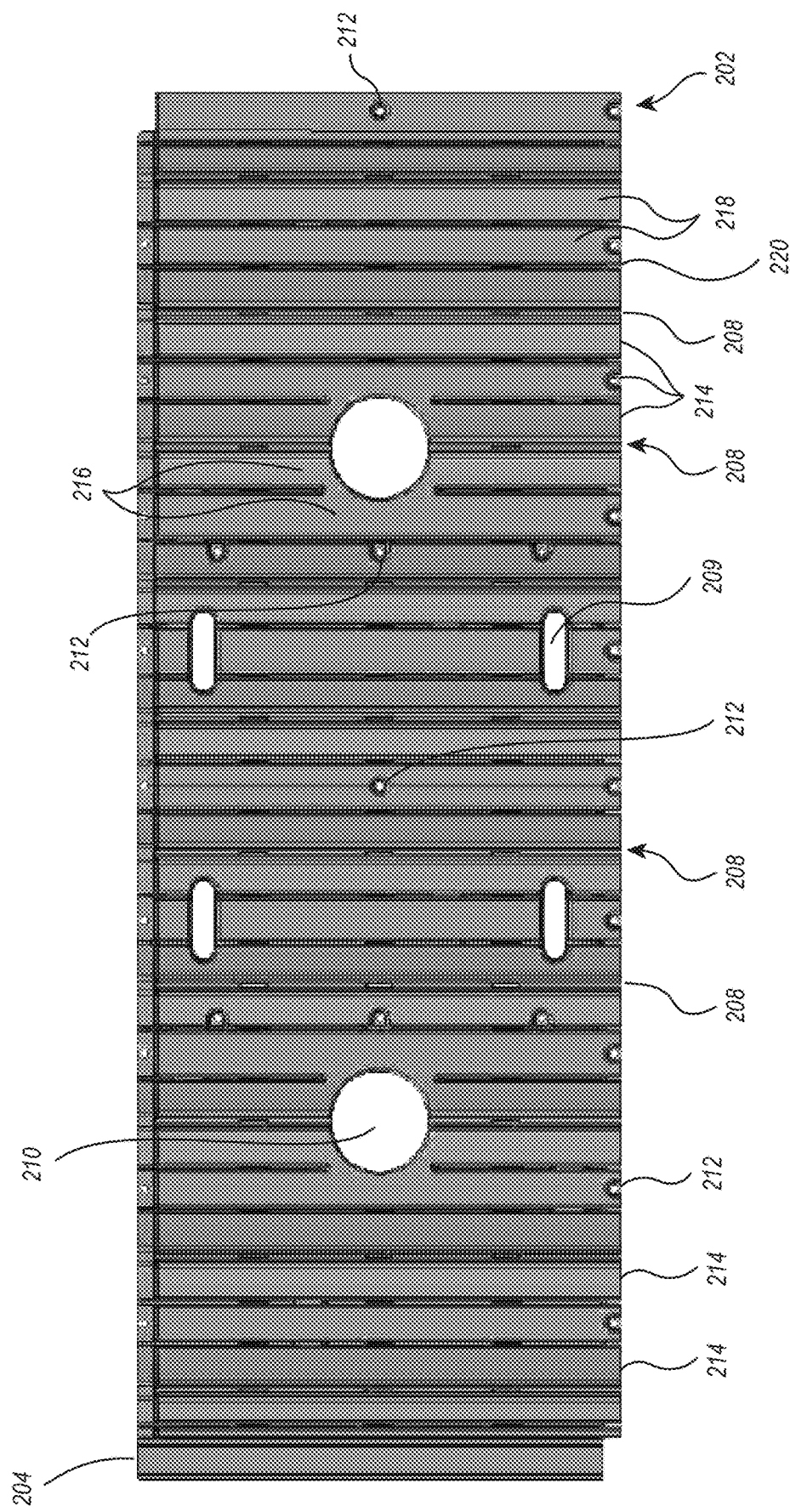
FIG. 6 is a top view of an inside of a flexible structure that is in the form of a tunnel portion.

Turning now to FIG. 6, additional details are provided concerning an example tunnel portion 200, as viewed from the bottom, which would be the inside of the tunnel portion 200 when the ends of the tunnel portion 200 are connected to each other. That is, when the tunnel portion 200 is in an assembled state, the elements shown in FIG. 6 are visible on the inside of the tunnel portion 200. As shown, the tunnel portion 200 can include one or more segments 214 that can take the form of laterally extending hollow portions that can be formed, for example, by a blow-molding process. The segments 214 can be similar, or identical, to each other in terms of their physical configuration, although such similarity or identity is not required and may be omitted in some embodiments.

As further indicated, the segments 214 can be arranged in groups, although that is not required. In particular, there may be three segments 214 between successive living hinges 208. This number of segments 214 between successive living hinges 208 can be larger or smaller however, and the scope of the invention is not limited to any particular configuration. As well, two or more segments 214 can be connected with each other, as indicated by the area at 216 for example. In other cases, such as in a separate embodiment, or within the same embodiment, two or more segments 214 can be separate from each other, as indicated by the segment pair 218. Where two segments 214, or portions of segments 214, are separate from each other, they can be separated by a gap 220.

With respect to the segments 206 and 214, and with reference to the example of FIG. 10 (discussed below), an exterior cross-section of a segment 206 and 214 may be generally rectangular in shape. However, other cross-sectional shapes can alternatively be used, such as semicircular for example, and the scope of the invention is not limited to any particular configuration of segments 206 or segments 214.

Figure 7:
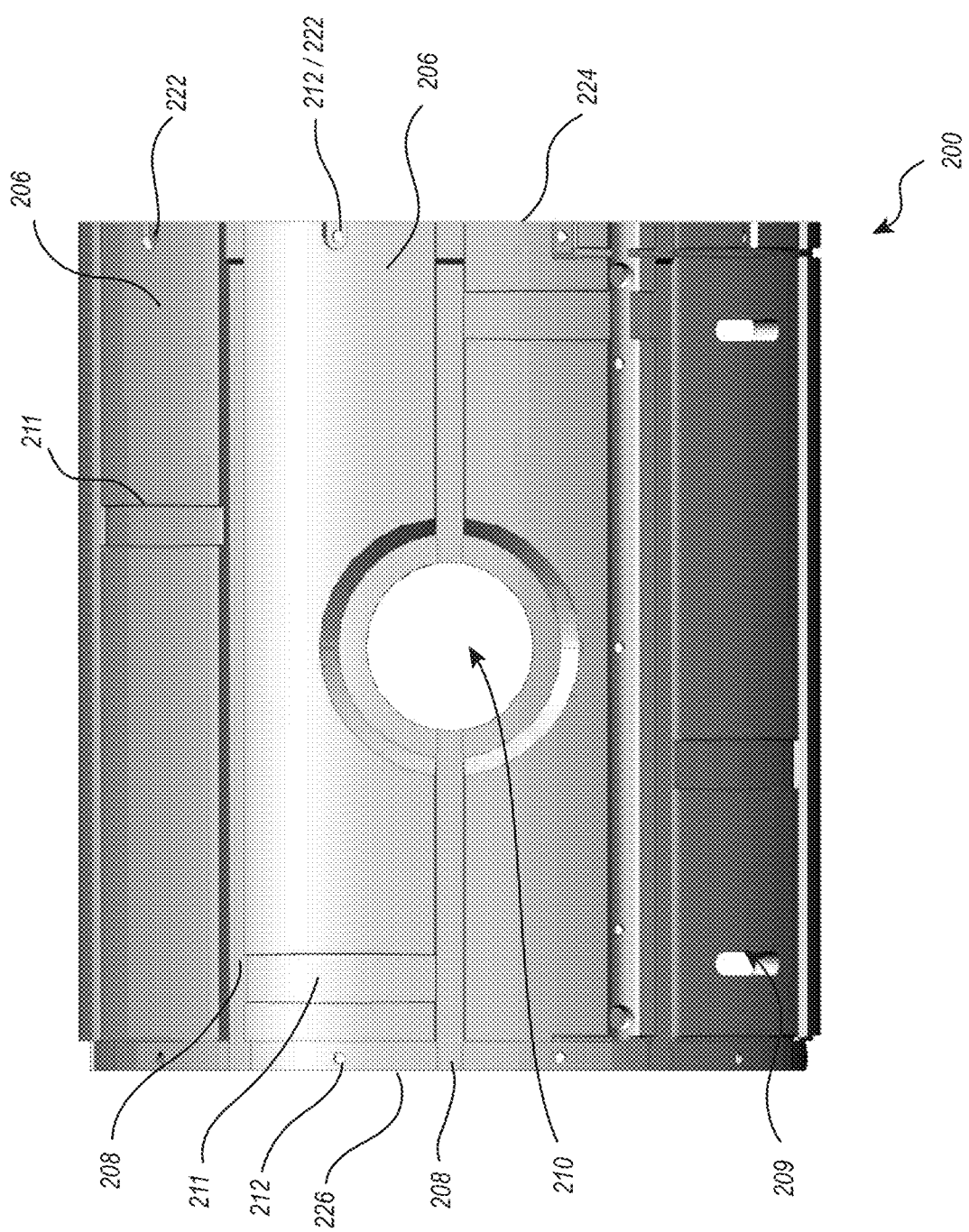
FIG. 7 is a side view of a flexible structure, in the form of a tunnel portion in a tunnel configuration in which the ends of the flexible structure are connected to each other.

With reference now to FIG. 7, a side view of a tunnel portion 200 in an assembled state is disclosed. In addition to the various elements discussed above in connection with FIG. 5, among others, the tunnel portion 200 may include one or more recesses 222 disposed about a hole 212 so that a fastener extending through the hole 212 does not protrude past, that is, outside of, an outer surface of the segment 206 in which the recess 222 is formed. The recesses 222 thus help ensure a tunnel portion 200 exterior free of protruding elements. As shown, the recesses 222 may only be positioned on one edge 224 of the tunnel portion 200. The opposing edge 226 of the tunnel portion 200 may be relatively flat, such as in the shape of a flange for example, such that recesses are not needed around the holes 212 on edge 226. Thus configured, the edge 226 of the tunnel portion 200 can be connected with an edge (similar or identical to edge 224) of another tunnel portion and, likewise, the edge 224 of the tunnel portion 200 can be connected with an edge (similar or identical to edge 226) of another tunnel portion.

As further shown in FIG. 7 in particular, the openings can have a variety of configurations. For example, the opening 210, which may serve as a window and/or for ventilation, in the center portion of the tunnel portion 200 has a generally circular shape, and is indicated as having a countersunk configuration, although that is not required. In contrast, the openings 209 located near the bottom of the tunnel portion 200 in FIG. 7 have a generally elongate form and extend lengthwise along the tunnel portion 200, as also shown in FIG. 6.

Figure 8:
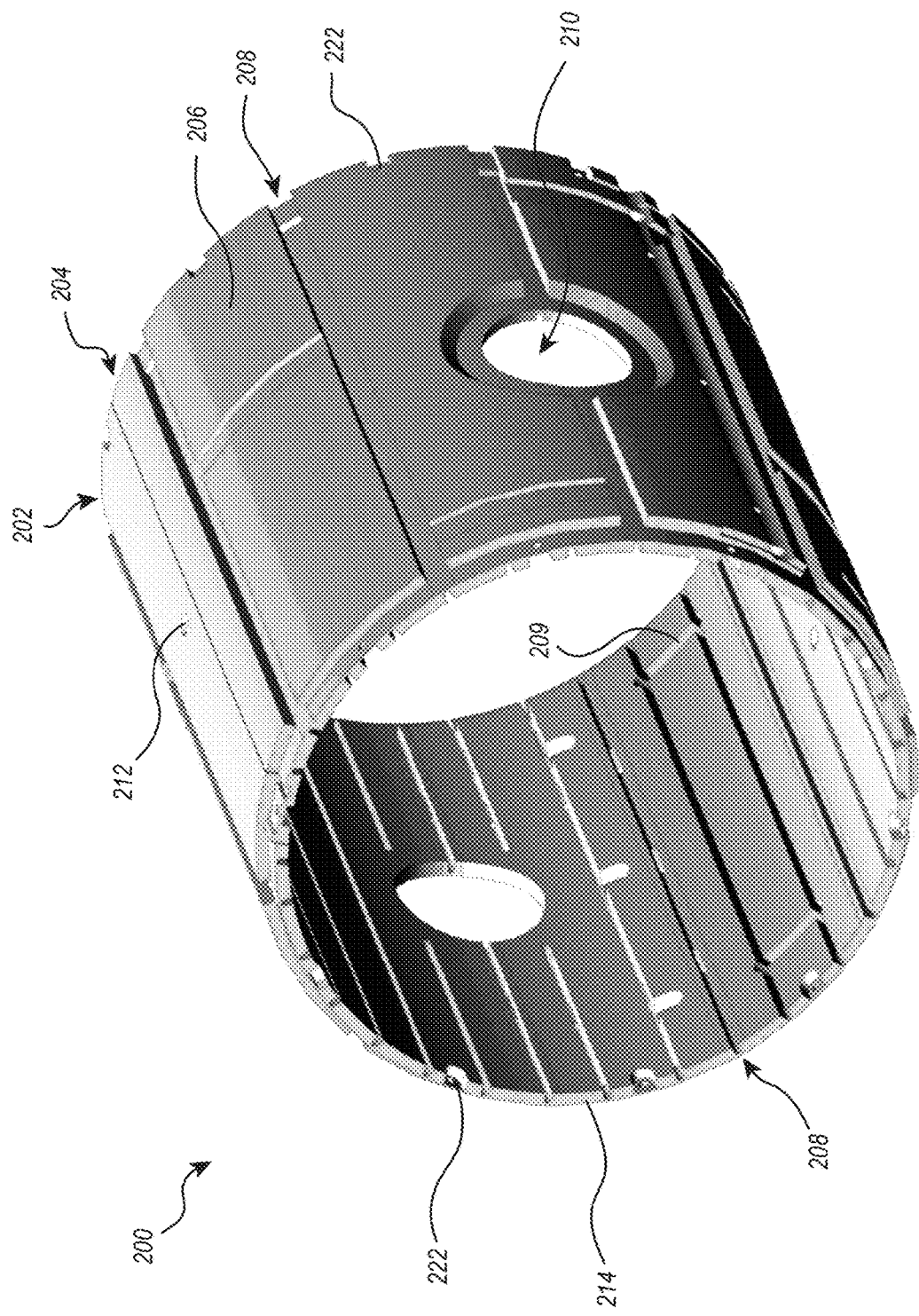
FIG. 8 is a perspective view of the flexible structure and configuration of FIG. 7.
Figure 9:
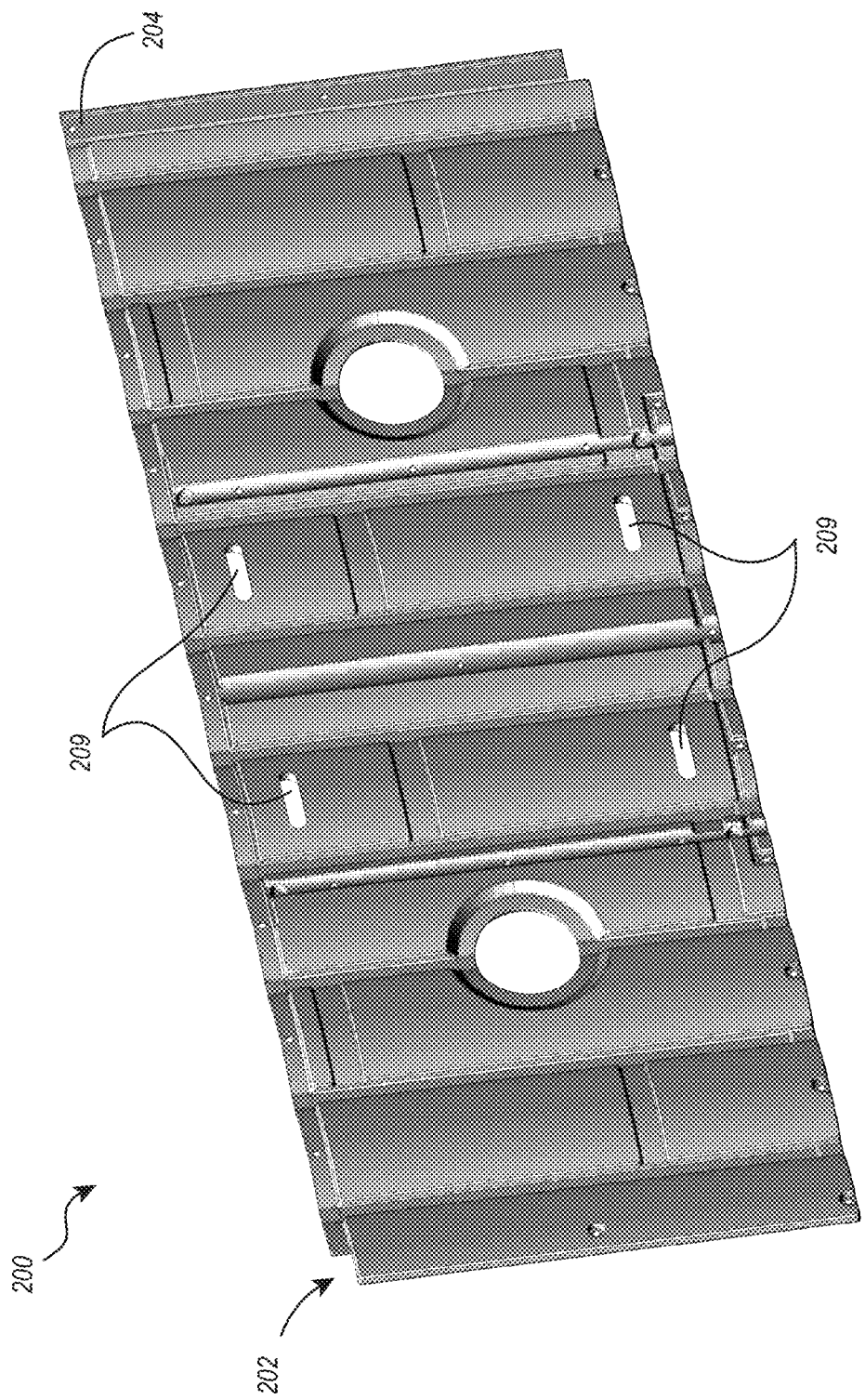
FIG. 9 is a perspective view of a flexible structure in the form of a tunnel portion in a ship flat configuration.
Figure 10:
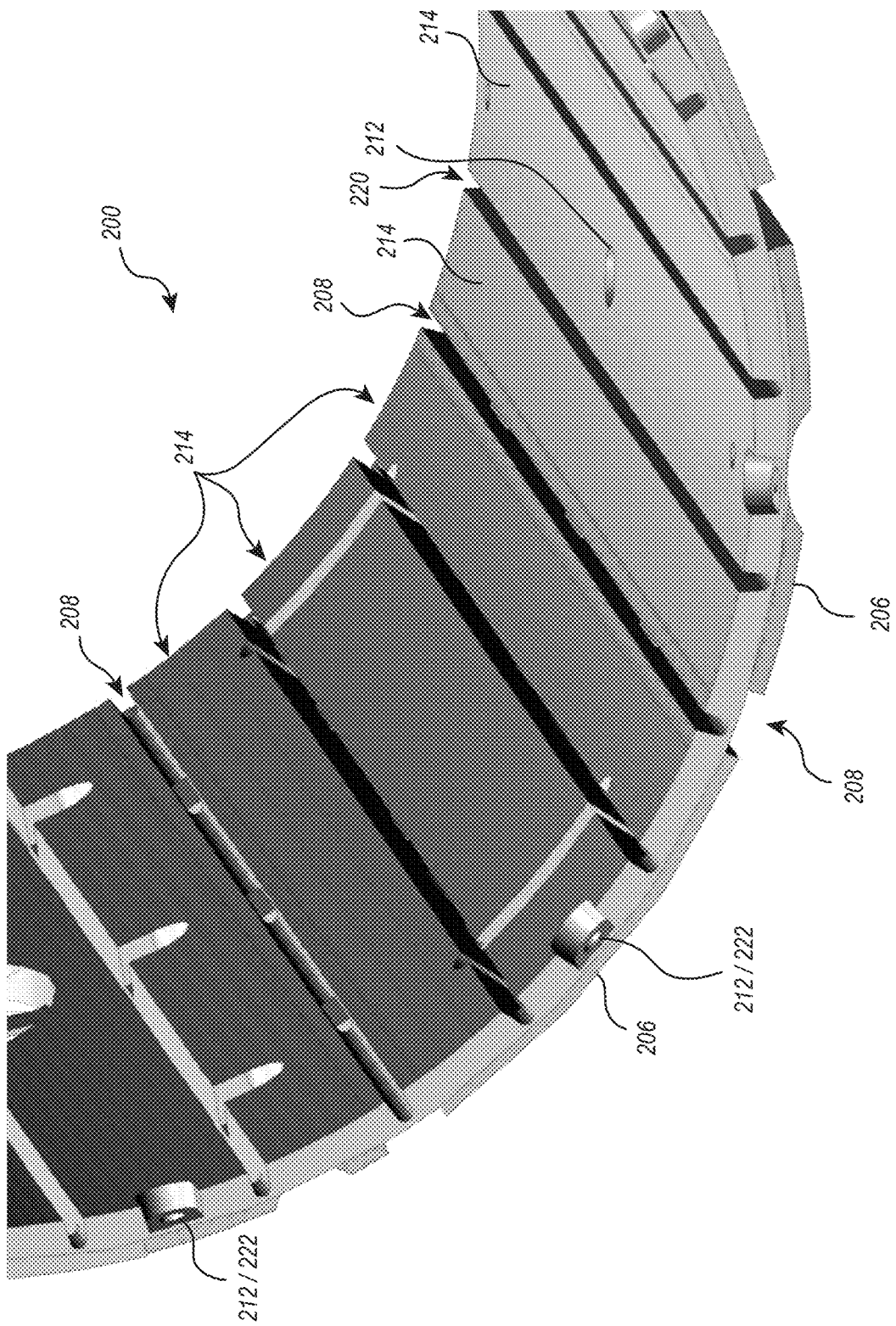
FIG. 10 is a detail perspective view of a flexible structure in the form of a tunnel portion that is bent.

With reference now to FIGS. 8-10, a perspective view of the tunnel section 200 is disclosed. As in the case of the example disclosed in FIG. 4, the arrangement of the segments 206 (outside) and the segments 214 (inside) relative to each other can be seen. In these example configurations, the inside of the tunnel portion 200 includes three segments 214 that are positioned between successive living hinges 208, while on the outside of the tunnel, only a single segment 206 is positioned between the same two living hinges 208. Of course, different relative numbers of segments 206 and/or segments 214 can be positioned between successive living hinges 208, and the scope of the invention is not limited to the illustrated examples.

Aspects of the aforementioned example configuration can also be seen in the perspective view of FIG. 9, and the detail view of FIG. 10. As best shown in FIG. 10, and noted earlier, a gap 220 may be provided between successive segments 214. However, because a segment 206 can be positioned on the other side of the tunnel portion 200, opposite the segments 214, the gap 220 may not, in every case, provide significant flexibility to the tunnel portion 200. Instead, the gap 220 may provide only limited flexibility, such as when the entire tunnel portion 200 flexes under the weight of a user. Such flexibility provided by the gap 220 can help prevent portions of the tunnel portion 200 from buckling under a load. Accordingly, the gap 220 can serve a different primary purpose than the living hinge 208.

Figure 11:
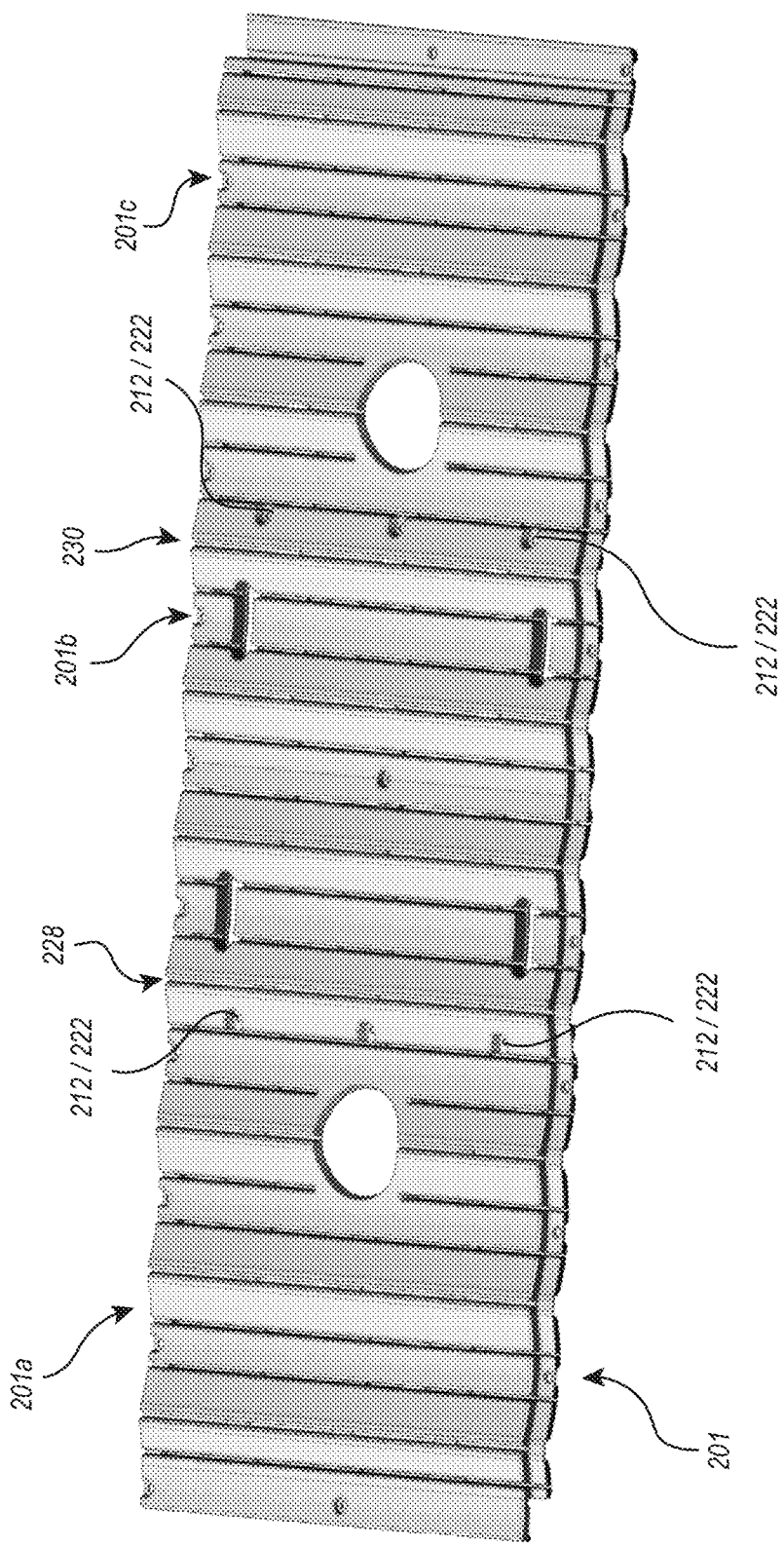
FIG. 11 is a top perspective view of an inside of a flexible structure that is in the form of a tunnel portion.

Turning now to FIG. 11, further details are provided concerning an alternative embodiment of a tunnel portion 200, denoted at 201. As noted elsewhere herein, at least some embodiments of a tunnel portion comprise, or consist of, a single piece of material. In other example embodiments however, a tunnel portion such as tunnel portion 201 may comprise, or consist of, multiple pieces of material that can be attached together. Except as noted below, the tunnel portion 201 can be similar, or identical, to the tunnel portion 200.

In particular, the tunnel portion 201 disclosed in FIG. 11 is made up of three individual pieces 201a, 201b and 201c, that are joined together at joints 228 (201a and 201b) and 230 (201b and 201c). Holes 212 and recesses 222 are provided to enable the connection of the three individual pieces 201a, 201b and 201c together with fasteners when the end or ends of an individual piece is/are overlapped with an end or ends of an adjacent individual piece (see also, FIG. 5). As well, and with brief reference again to FIG. 5, holes 232 can be provided that enable end portions 234 and 236 to be attached to each other to form a tunnel portion 200 in an assembled state. Note that holes 232 can be similar, or identical, to holes 212 but are differently designated in FIG. 5 to enable illustration, in FIG. 11, of the aforementioned concept of the connection of overlapping portions of the individual pieces 201a, 201b and 201c.

As FIG. 11 thus indicates, in some embodiments, a tunnel portion 201 can be made up of individual pieces that can have different respective configurations. Accordingly, various individual pieces, such as 201a, 201b, and 201c for example, can be mixed and matched together to produce a customized configuration for the tunnel portion 201. Correspondingly, some embodiments of a tunnel can include tunnel portions 201 having different respective configurations, while in other embodiments, a tunnel can include tunnel portions 201 that all have the same, or substantially the same, configuration. Moreover, a given individual piece, such as 201a, 201b, or 201c for example, can be readily removed and replaced with another individual piece if desired. As well, a tunnel can include one or more tunnel portions 201 together with one or more tunnel portions 200.

Finally, it will be apparent from this disclosure that a tunnel portion can have multiple individual pieces that are connectable together, and one, some or all of those individual pieces may have one or more living hinges. Thus, except for the fact that individual pieces such as 201a, 201b, or 201c are relatively shorter in length than a tunnel portion 200, the individual pieces may otherwise have the same configuration as any part of a tunnel portion 200 and, as such, may include any combination of the features and elements disclosed in the embodiments of FIGS. 3-10. In some alternative embodiments, living hinges may be omitted from one, some, or all, of the individual pieces.

D. Alternative Embodiment of a Play Set with Tunnel Portions

Figure 12:
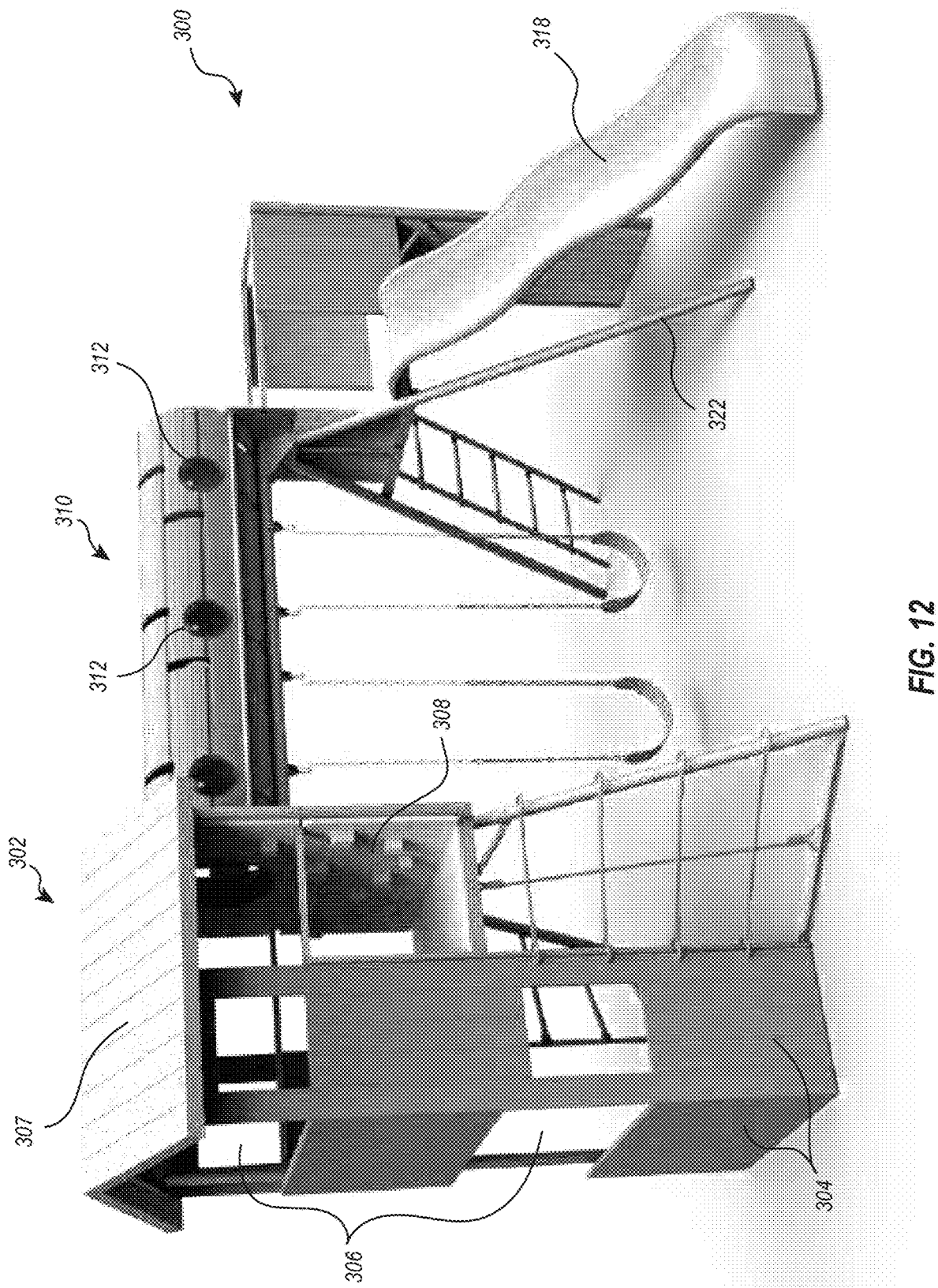
FIGS. 12 and 13 are directed to another embodiment of a playset that can include one or more tunnel portions as disclosed herein.
Figure 13:
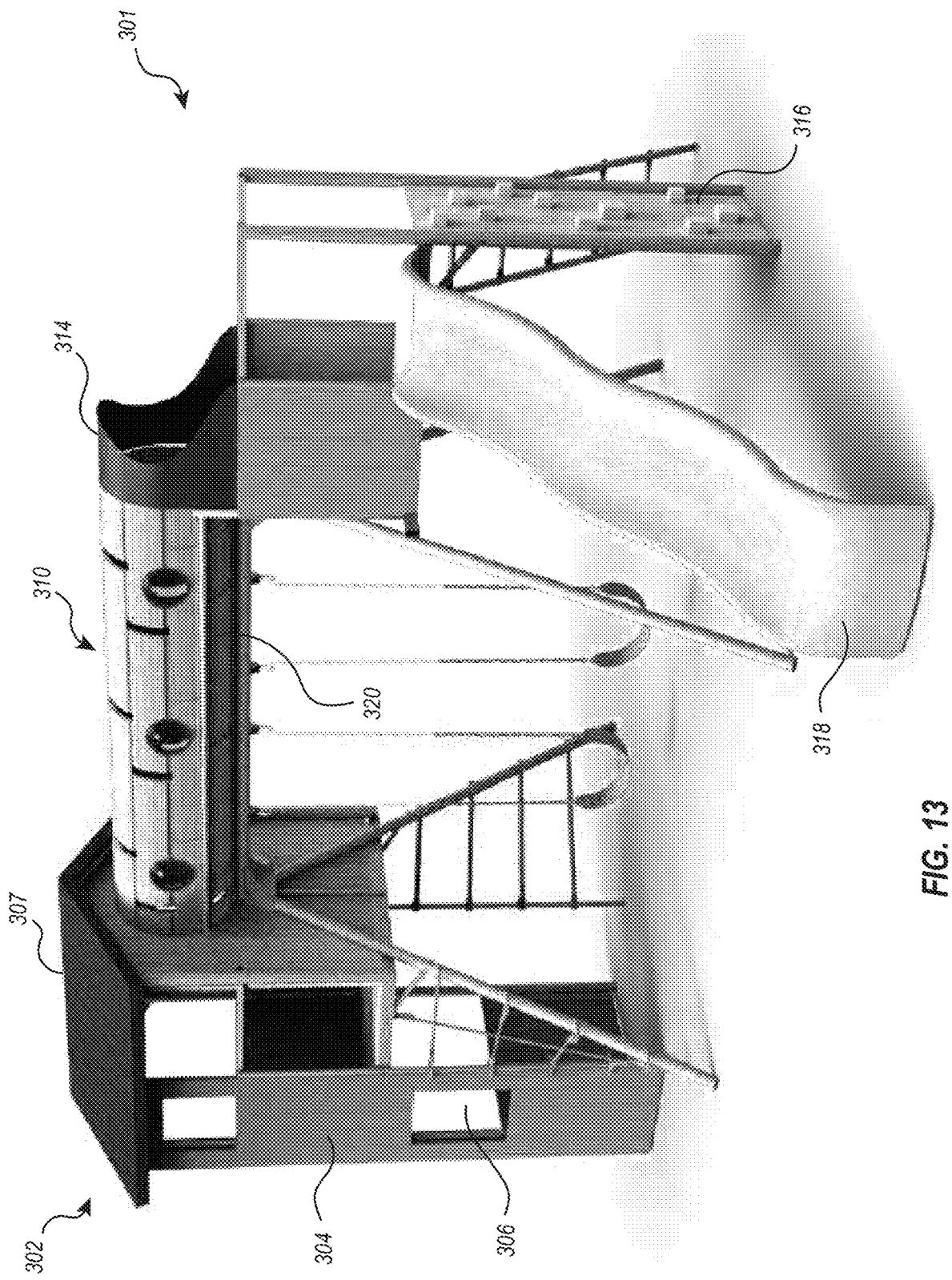

Directing attention now to FIGS. 12 and 13, details are provided concerning two example alternative embodiments of a play set, denoted generally at 300 and 301, respectively. Except as noted below, the play sets 300 and/or 301 can be similar, or identical, to the play set 100. As well, the play sets 300 and/or 301 may include some or all of the same elements as the play set 100, although one or more of such elements can be arranged differently in the respective play sets. Finally, the play sets 300 and 301 can be similar or identical to each other, except as may be noted below and/or indicated in FIGS. 12 and 13.

In the illustrated example, the play sets 300 and 301 can include a tower 302 with one or more panels 304 that include openings 306 for ventilation and viewing, and the tower can include a roof 307. This example of the tower 302 includes an interior climbing wall 308 leading to a tunnel 310 that can include one or more tunnel portions, examples of which are disclosed herein. One or more of the tunnel portions can include a window 312, such as a bubble window for example, while in other embodiments, the window(s) 312 can be omitted and simply openings in the tunnel portions provided. At its end opposite the tower 302, the tunnel 310 can include an entrance portion 314, as shown in FIG. 13. The entrance portion 314 can be omitted in some embodiments however, as indicated in the arrangement of FIG. 12. An additional climbing wall 316 can be provided proximate the end of the tunnel 310 that is closest to a slide 318. Where a tunnel 310 is provided, it can be supported by one or more support elements 320 extending along the length of the tunnel 310 and comprising parts of a frame 322.

E. Alternative Embodiment of a Tunnel and Tunnel Portions

Directing attention now to FIGS. 14-22, details are provided concerning an alternative embodiment of a tunnel, one example of which is generally denoted at 400 and which includes one or more tunnel portions. Except as may be noted below, the tunnel 400 and tunnel portions 450, respectively, may be similar, or identical, to any other embodiment of a tunnel and tunnel portions disclosed herein, including, but not limited to tunnel 102, tunnel 310, tunnel portion 104, and tunnel portion 200. As such, the following discussion is generally concerned with differences between the embodiments of FIGS. 14-19 and the other embodiments disclosed herein.

Figure 14:
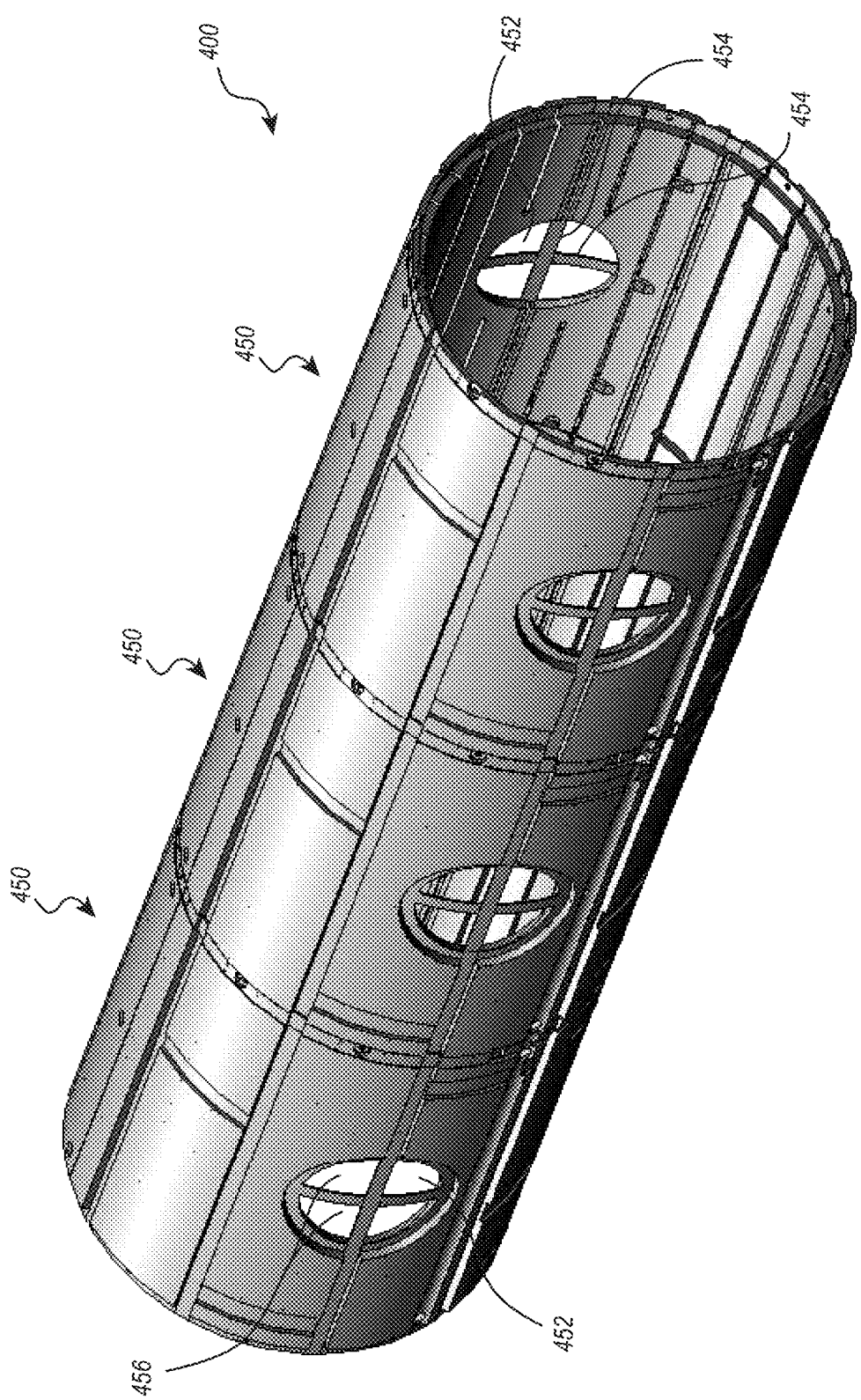
FIGS. 14-25 disclose aspects of an alternative embodiment of a tunnel and associated tunnel portions.
Figure 15:
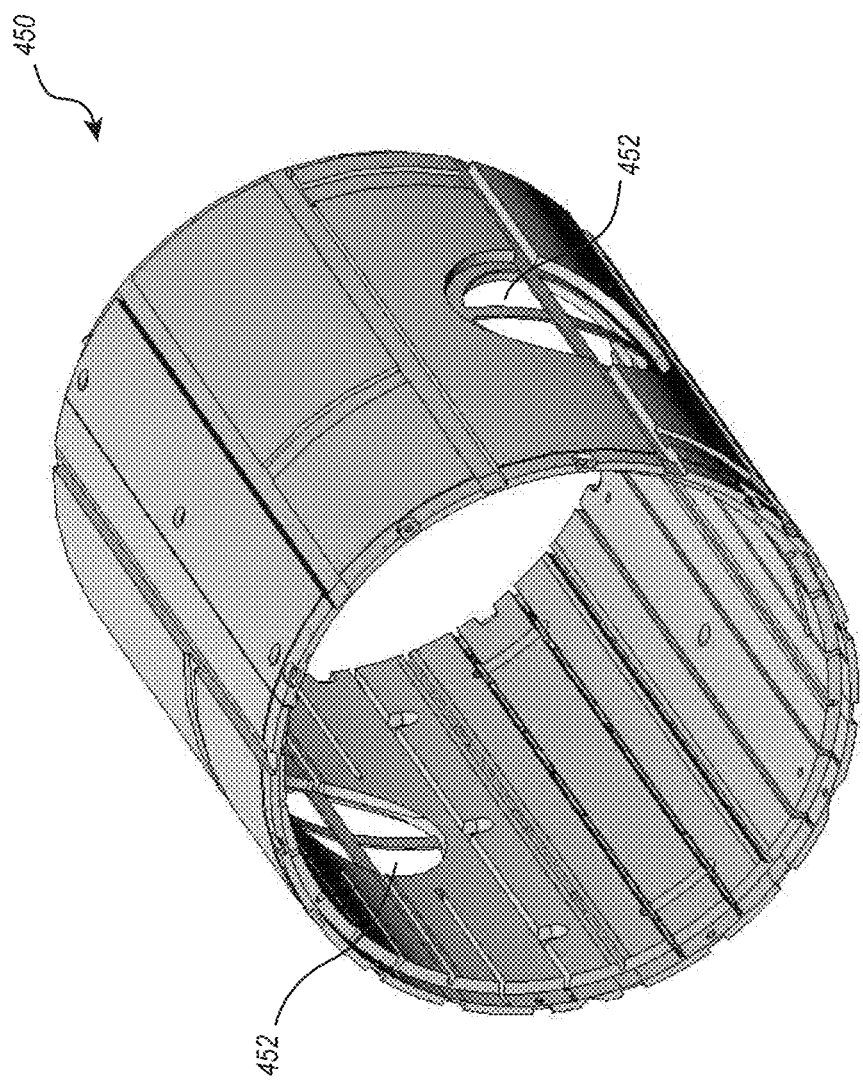
Figure 16:
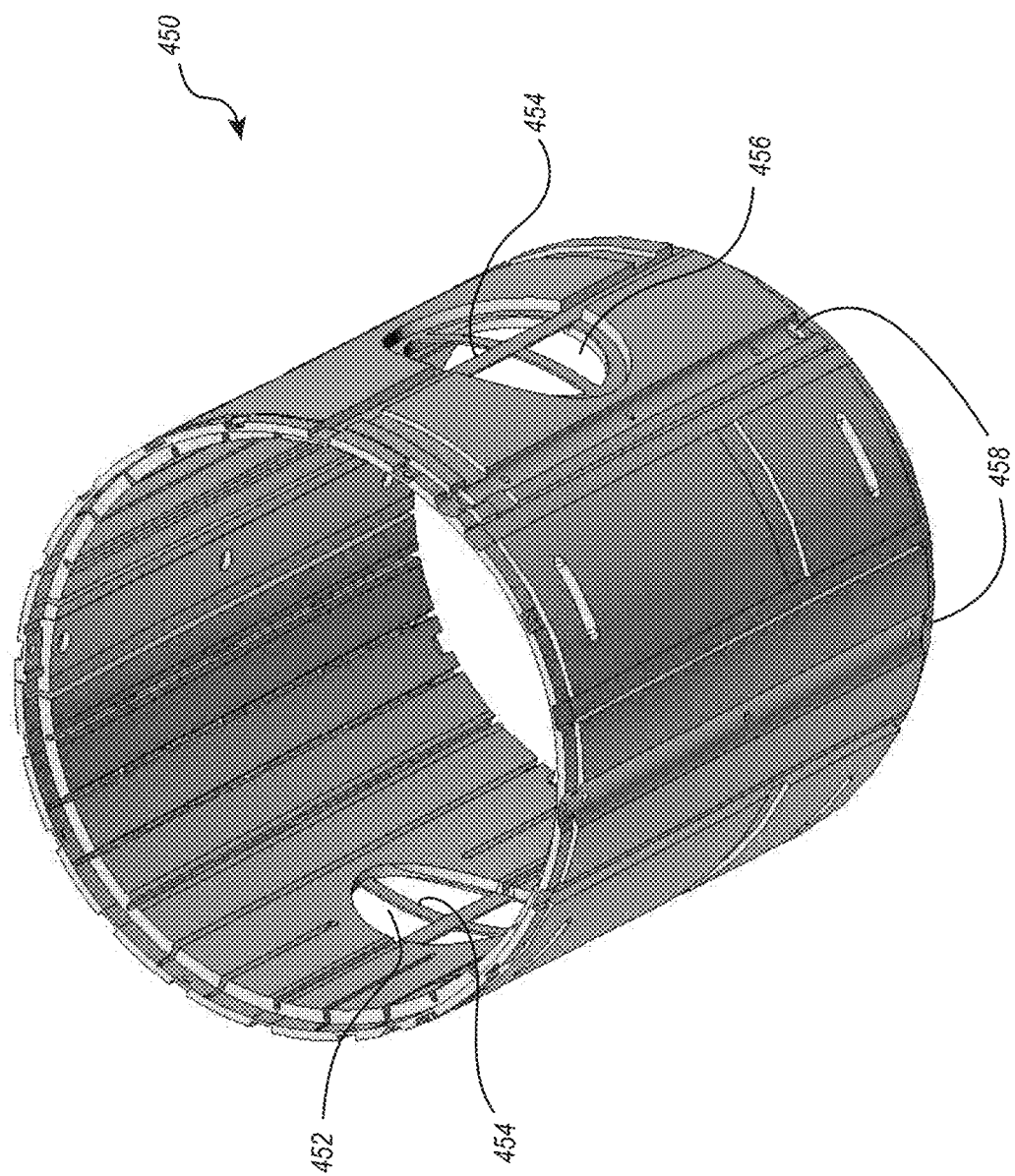
Figure 17:
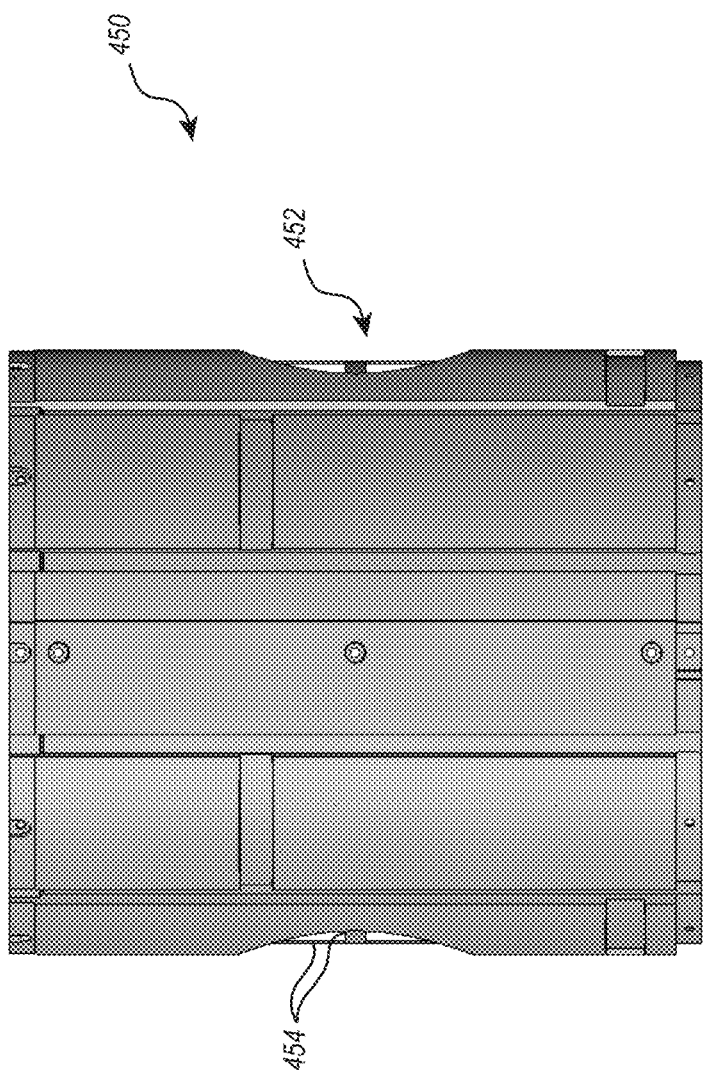
Figure 18:
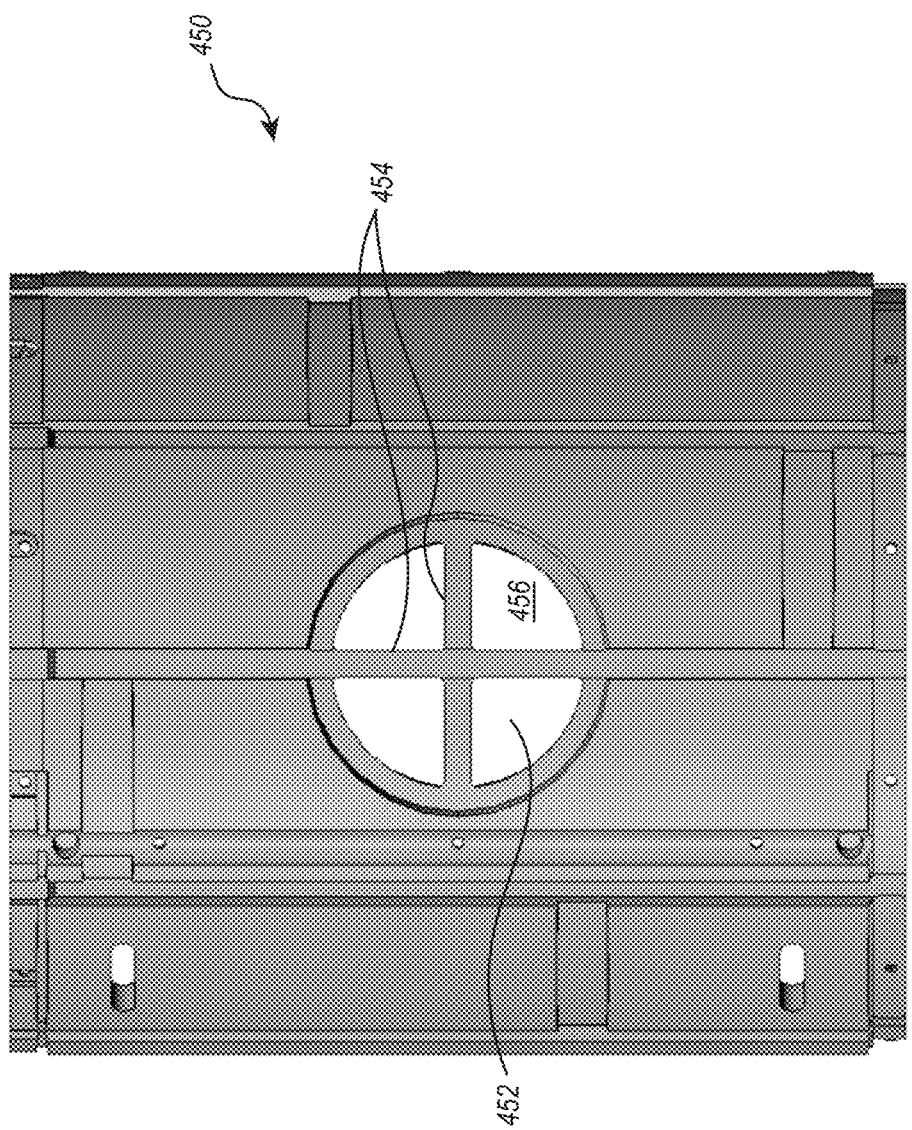
Figure 19:
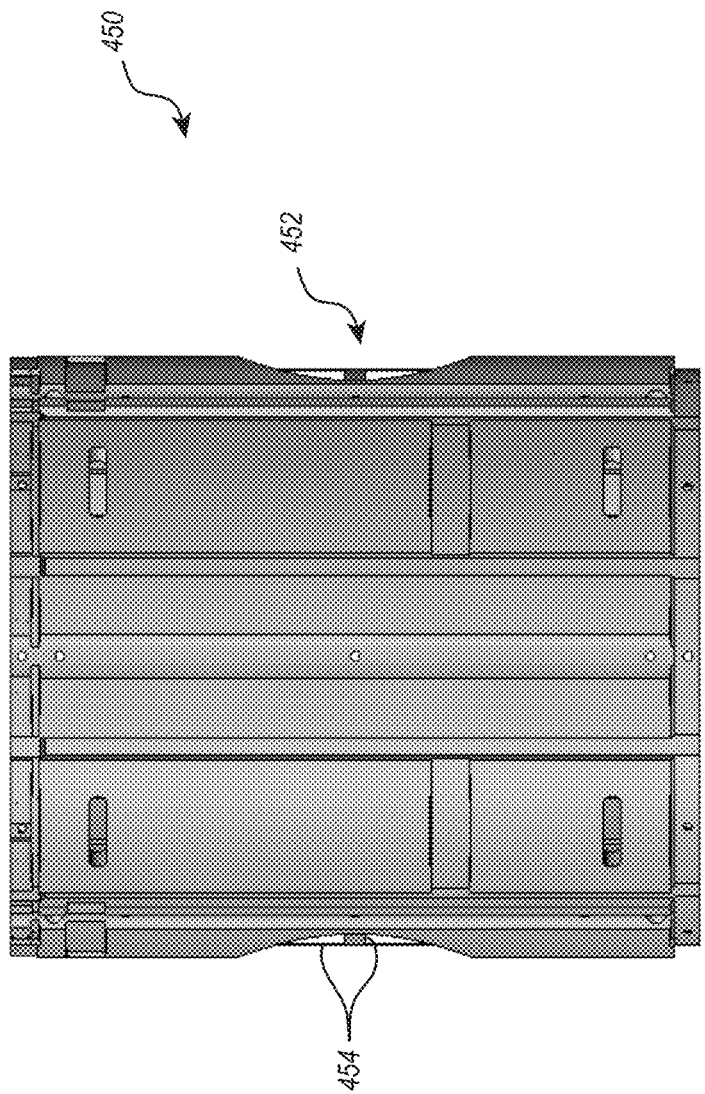

With particular attention first to FIGS. 14-19, details are provided concerning the example tunnel portions 450. As indicated in FIG. 14, multiple tunnel portions 450 can be connected together to form the tunnel 400. In general, the tunnel portions 450 can releasably connect to each other using the same configuration and structure as included in the tunnel portion 104 and tunnel portion 200.

As shown in FIGS. 14-19 however, the example tunnel portions 450 are different from the tunnel portion 104 and tunnel portion 200 in that the tunnel portions 450 each include one or more windows 452 that are generally round in shape and have one or more grill pieces 454 that collectively impart a lattice configuration to the windows 452. In the illustrated example, two grill pieces 454, arranged to be generally perpendicular to each other, are provided such that the window 452 is divided into four portions of generally equal size and configuration. The grill pieces 454 may be integral elements of the tunnel portion 450, formed by a blow-molding or other process when the tunnel portion 450 is created. In addition to imparting a lattice configuration to the window 452, the grill pieces 454 may also lend strength and structural integrity to the overall tunnel portion 450, particularly to those parts of the tunnel portion 450 that are located relatively close to the window 452.

While the illustrated example of the window 452 is round and includes two grill pieces 454 that divide the window 452 into four portions 456, the scope of the invention is not limited to that example. Other embodiments of the window can be of any desired shape, including rectangular, polygonal, or oval for example, and may include more, or fewer, grill pieces. As well, the window can alternatively be divided into more, or fewer, than four portions. In other embodiments, the grill pieces 454 can be eliminated entirely. Thus, the windows disclosed in FIGS. 14-19 are provided only by way of example, and are not intended to limit the scope of the invention in any way.

With continued reference to FIGS. 14-19, the example tunnel portion 450 includes two windows 452, disposed about 180 degrees apart. However, no particular number of windows are required to be provided in any particular tunnel portion 450 and, in fact, tunnel portions disclosed herein are not required to have any windows at all. Where windows, such as windows 452 for example, are provided, they can be arranged at any desired location in a tunnel portion 450 and are not required to be located in any particular position relative to each other, or relative to any other part of the tunnel portion 450. As well, the window(s) 452, if provided, can be any size.

Finally, the example tunnel portions 450 can include one or more longitudinal grooves 458, which may have a partial circular cross-sectional shape, configured and arranged to engage support structure of a play set. In other embodiments, the longitudinal grooves 458 may be omitted.

Figure 20:
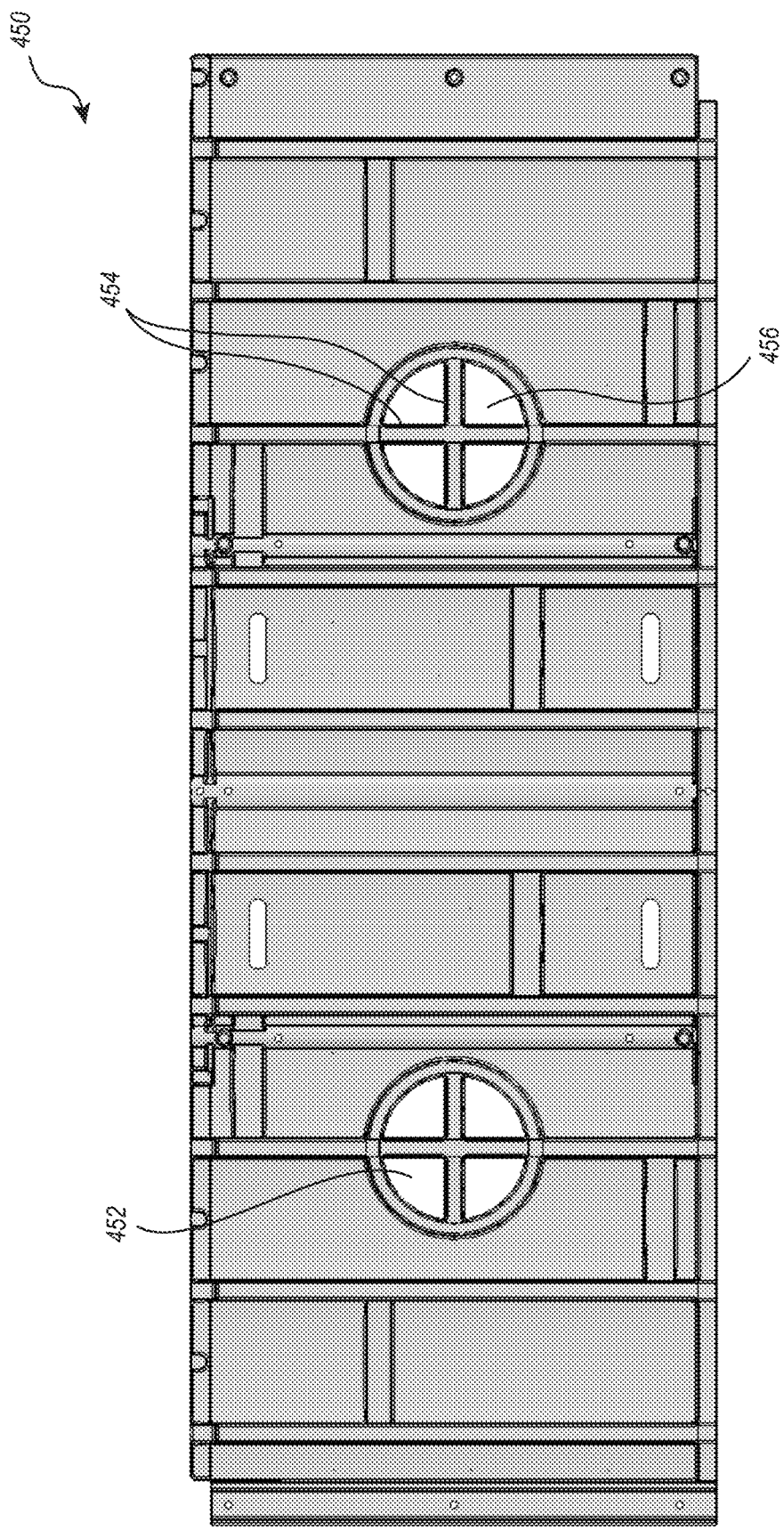
Figure 21:
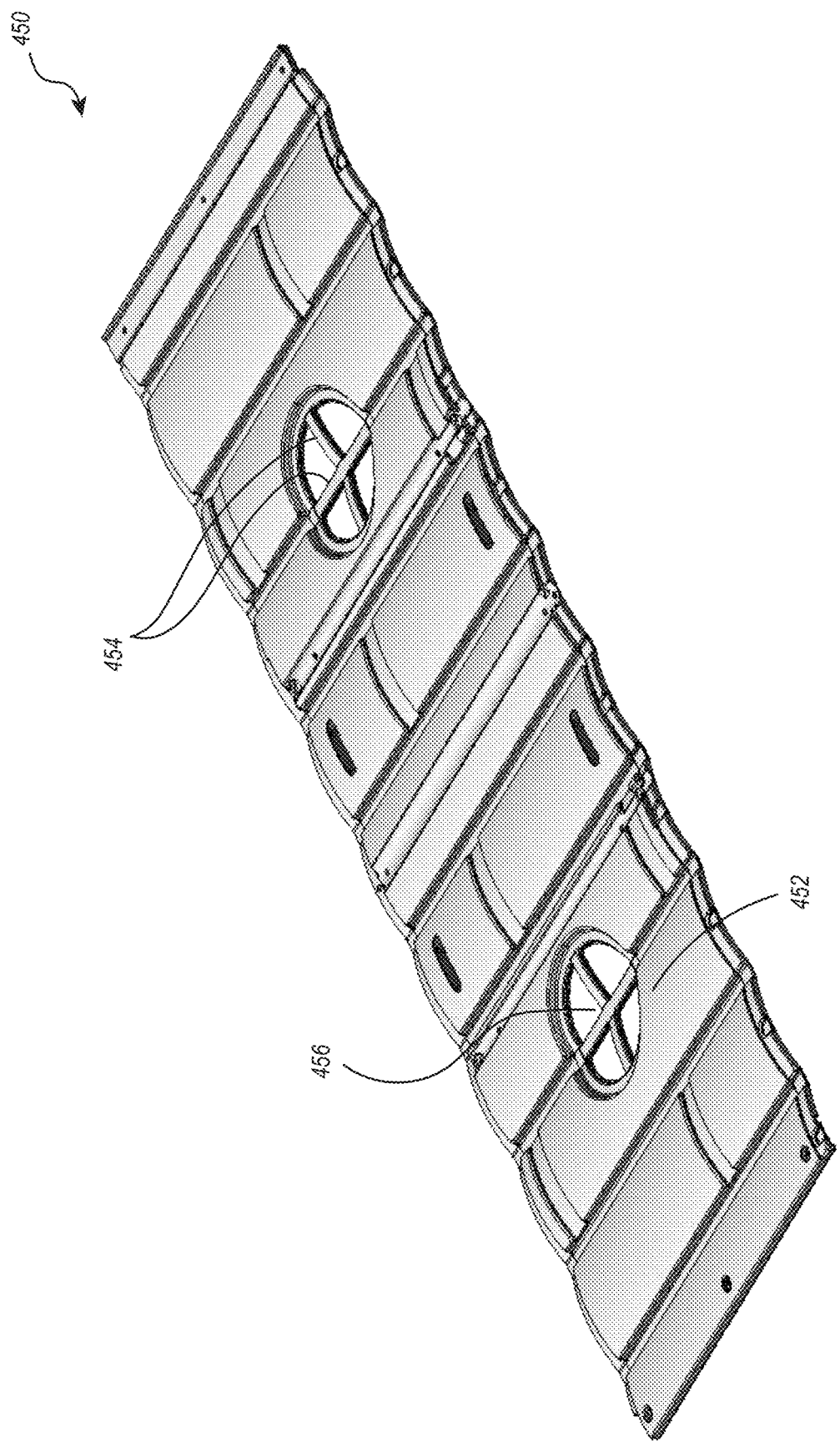
Figure 22:
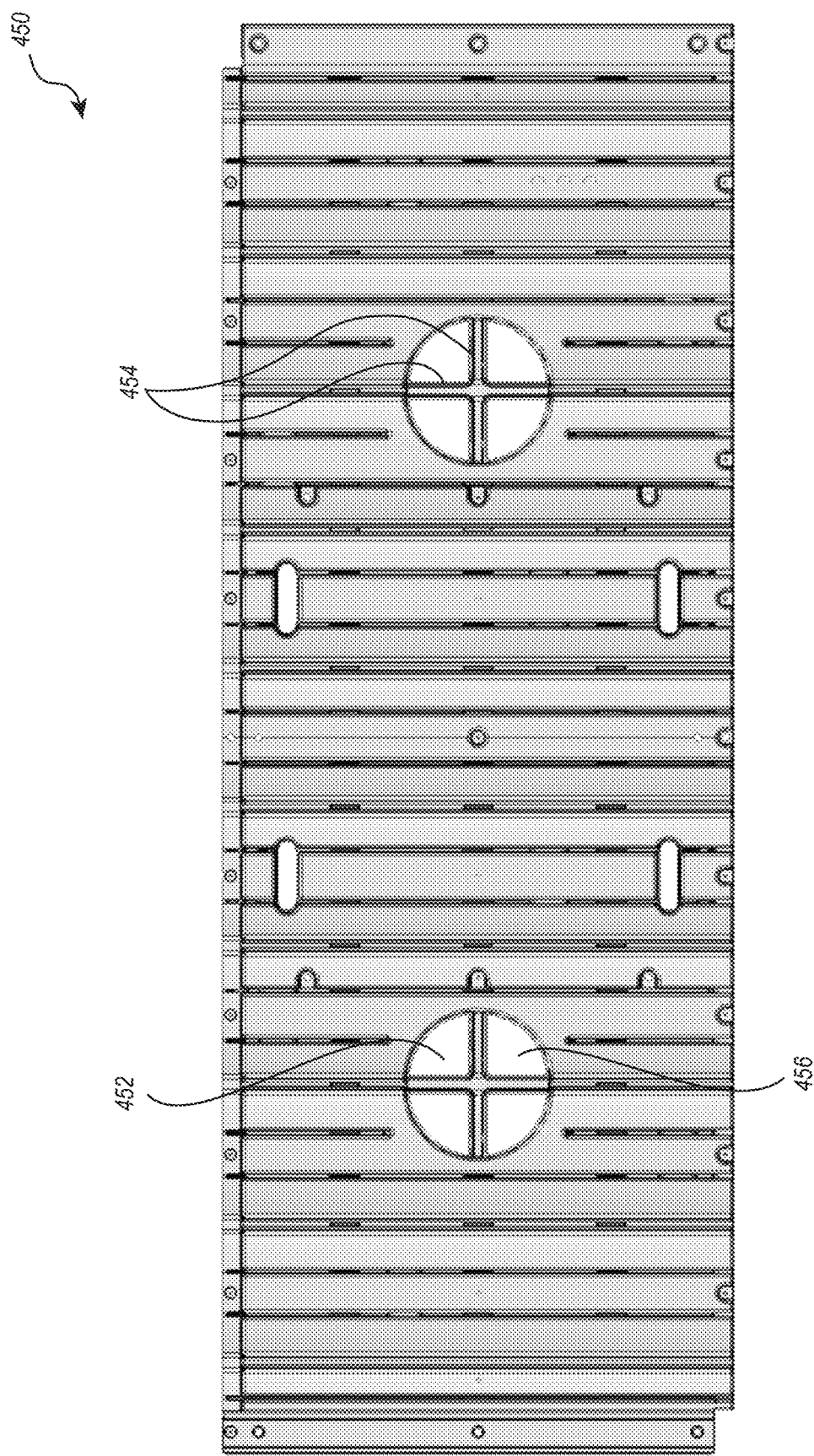
Figure 23:
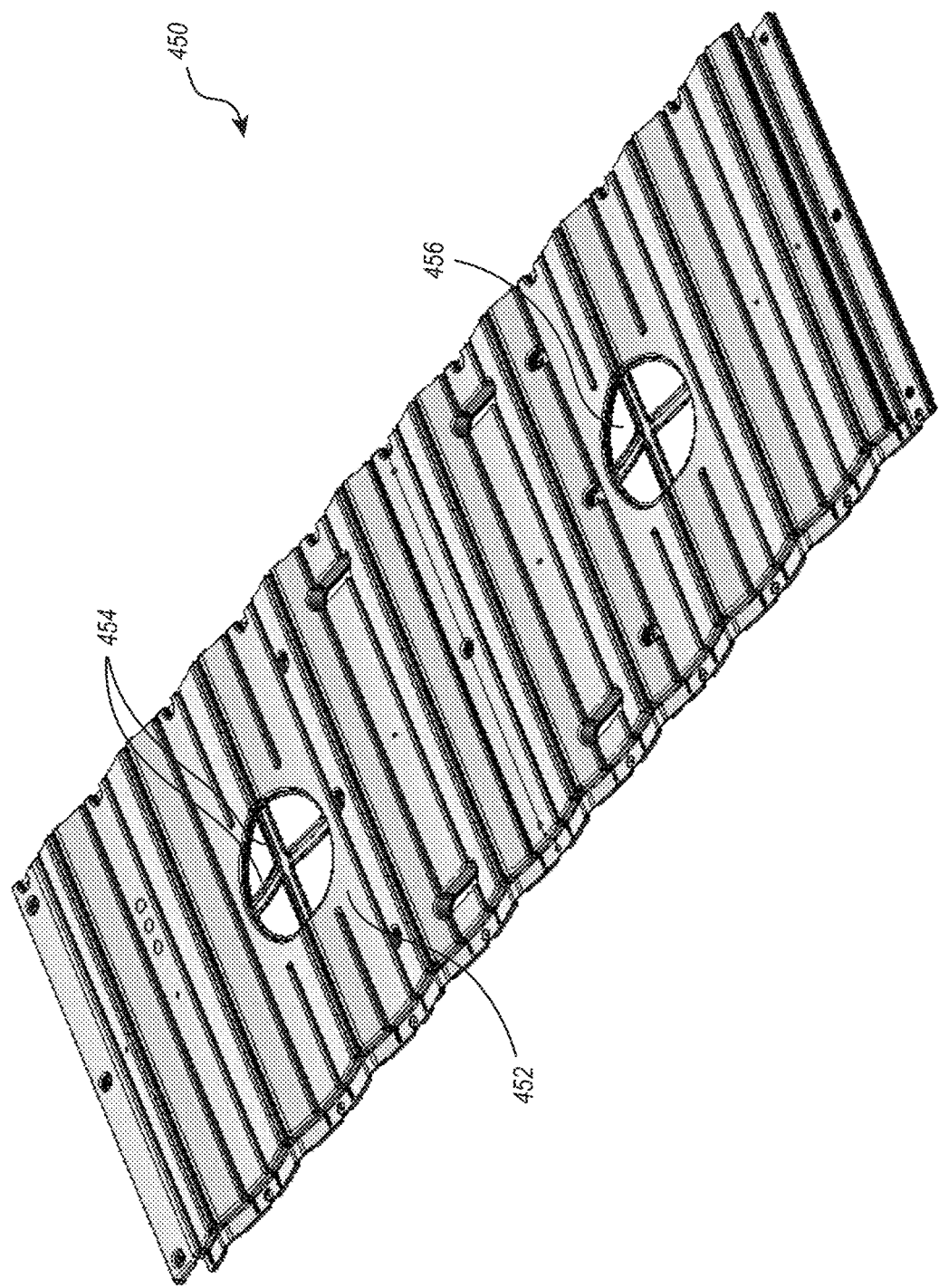

With brief reference next to FIGS. 20-23, it can be seen that, like the other embodiments of tunnel portions disclosed herein, the tunnel portions 450 can assume a flat, or relatively flat, shipping configuration. FIGS. 20 and 21, in particular, show the exterior of the tunnel portion 450 in a ship flat configuration, while FIGS. 22 and 23 show the interior of the tunnel portion 450 when the tunnel portion 450 is in a ship flat configuration.

Figure 24:
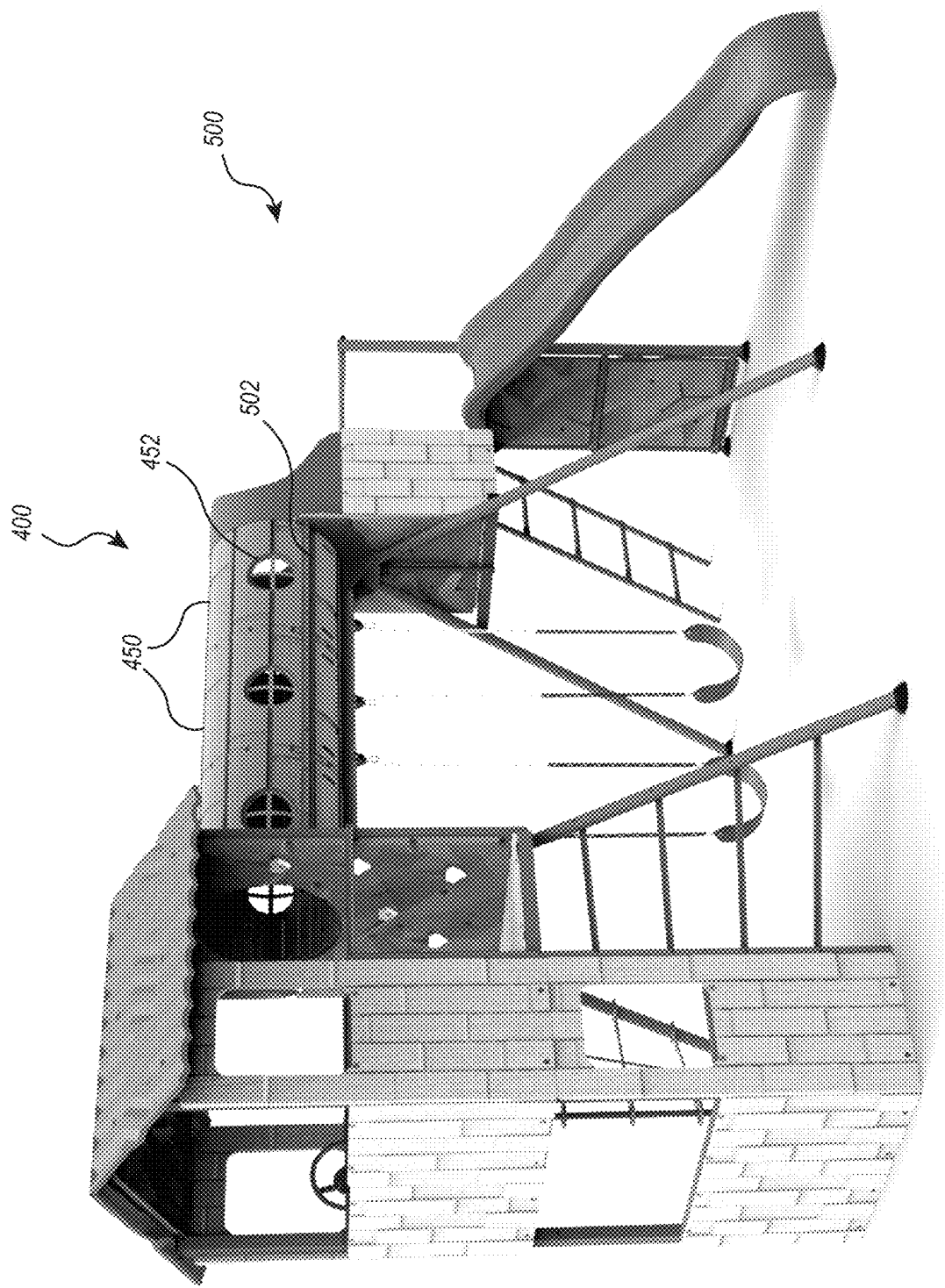
Figure 25:
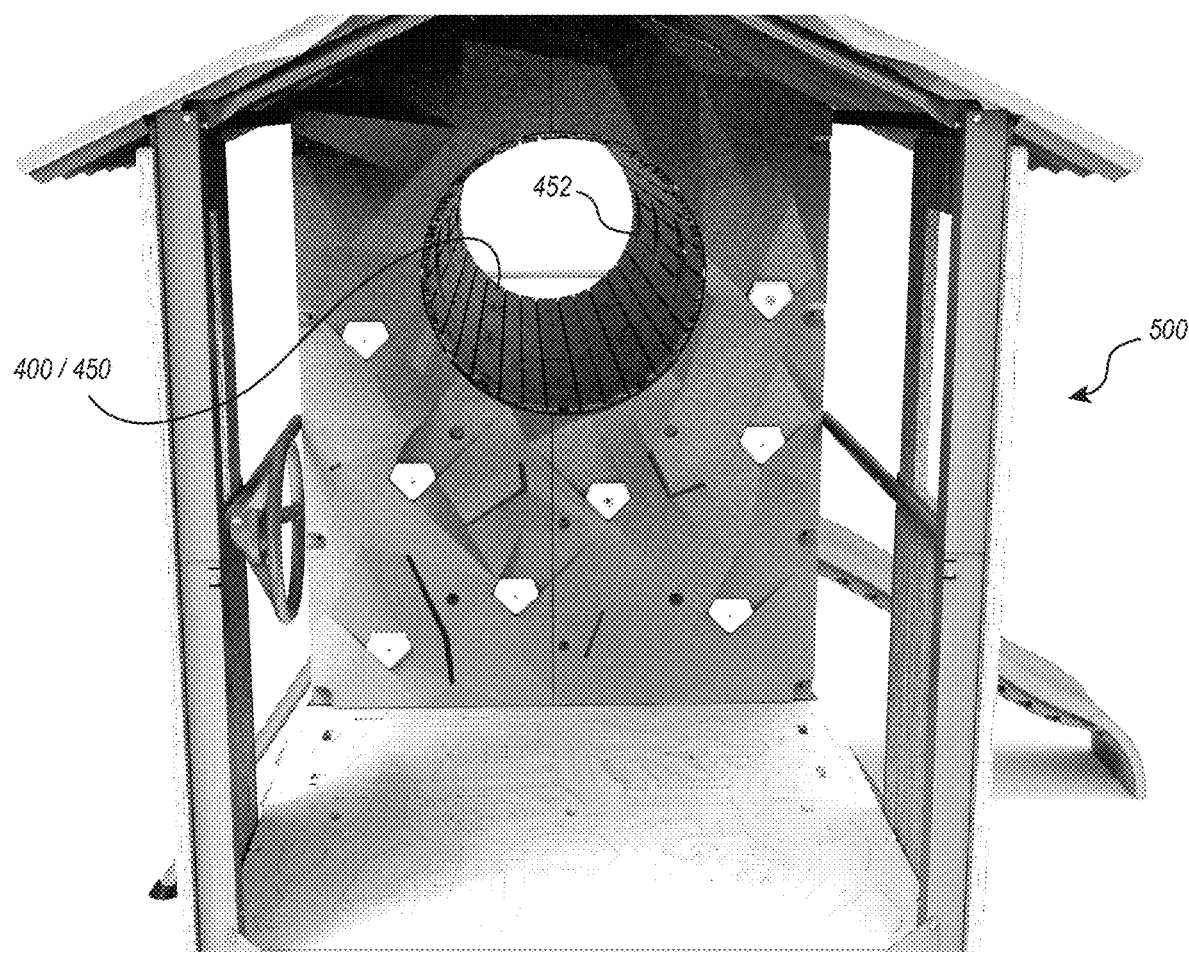

Finally, with reference to FIGS. 24 and 25, an example tunnel 400 including one or more tunnel portions 450 is disclosed. FIG. 24 discloses an example play set 500 that includes a tunnel 400 having one or more tunnel portions 450, and FIG. 25 is an end view of the tunnel 400. In more detail, the illustrated example of the tunnel 400 includes three tunnel portions 450, each of which includes two windows 452. In addition to the tunnel 400, the play set 500 can include any combination of one or more of the other example play set components disclosed herein.

With particular reference to FIG. 24, the play set 500 can include one or more support structures, such as support structure 502, that engages part of one or more tunnel portions 450, such as the longitudinal grooves 458 (FIG. 16) for example, so as to support the tunnel portion(s) 450. The support structure 502 can be an elongate round tube having a shape that is generally complementary with the cross section shape of the longitudinal grooves 458, although no particular shape of support structure 502 is necessarily required.

F. Advantageous Aspects of Some Example Embodiments

Tunnel portion configurations, such as the examples disclosed in the Figures, may be beneficial in a variety of respects. For example, and as will be apparent from the present disclosure, one or more embodiments of the invention can provide one or more advantageous and unexpected effects, in any combination, some examples of which are set forth below. It should be noted that such effects are neither intended, nor should be construed, to limit the scope of the claimed invention in any way.

In particular, one advantageous aspect of at least some embodiments of the invention is that the tunnel portions can be packaged and shipped in a flat configuration. Thus, a relatively greater number of tunnel portions can fit in a defined space, such as a shipping container for example, than would be possible if the tunnel portions were shipped in their assembled configuration. Consequently, a per unit shipping cost can be reduced.

As well, the tunnel portions are relatively easy to manipulate into an assembled state. As noted herein, the first and second ends of a flat tunnel portion can be connected to each other to form an assembled tunnel portion. This can be achieved through the implementation of one or more living hinges that enable the tunnel portion to be bent, such as into a generally circular form, so that first and second ends of the flat tunnel portion are brought into contact with each other for assembly. The assembled tunnel portion can then be connected, if desired, to one or more additional assembled tunnel portions to form a complete tunnel.

Finally, a variety of different tunnel configurations can be defined. Each tunnel portion and/or individual piece of a tunnel portion can be manufactured with various different attributes, and then combined with one or more other tunnel portions to implement a customized tunnel configuration. By way of example, some tunnel portions can include openings such as for viewing for example, and such a tunnel portion can be connected with a tunnel portion without openings. As well, the interior and/or exterior configuration of each individual tunnel piece and/or tunnel portion can be constructed with particular attributes.

G. Some Further Example Embodiments

Following are some further example embodiments within the scope of this disclosure.

Embodiment 1

A tunnel portion, comprising:
an elongate body having a first end and a second end, and the first end is configured to be connected to the second end; one or more living hinges positioned in the elongate body between the first end and the second end, wherein the one or more living hinges are configured and arranged to enable the first end and second end to be moved toward each other, and wherein the tunnel portion is configured to assume both a flat state and an assembled state, and in the assembled state, the first end of the elongate body is connected to the second end of the elongate body.

Embodiment 2

The tunnel portion as recited in embodiment 1, wherein the tunnel portion is in the form of a unified, single piece structure in which the living hinges are integrally formed.

Embodiment 3

The tunnel portion as recited in embodiment 1, wherein the tunnel portion comprises a plurality of individual pieces, and each of the individual pieces is in the form of a unified, single piece structure.

Embodiment 4

The tunnel portion as recited in embodiment 3, wherein the individual pieces are configured to be connected to each other.

Embodiment 5

The tunnel portion as recited in embodiment 3, wherein one or more of the individual pieces includes one of the living hinges.

Embodiment 6

The tunnel portion as recited in embodiment 1, wherein the elongate body has first and second edges extending lengthwise, and one or both of the first and second edges is configured to connect to a corresponding edge of another tunnel portion.

Embodiment 7

The tunnel portion as recited in embodiment 1, wherein part of the elongate body is hollow.

Embodiment 8

The tunnel portion as recited in embodiment 1, wherein the elongate body includes one or more tack offs.

Embodiment 9

The tunnel portion as recited in embodiment 1, wherein the tunnel portion is made of plastic.

Embodiment 10

The tunnel portion as recited in embodiment 1, wherein the one or more living hinges are relatively more flexible than another part of the tunnel portion.

Embodiment 11

The tunnel portion as recited in embodiment 1, wherein the volume occupied by the tunnel portion when the tunnel portion is in the assembled state is larger than the volume occupied by the tunnel portion when the tunnel portion is in the flat state.

Embodiment 12

A package comprising two or more tunnel portions each in a flat state and stacked on top of each other or side-by-side on edge, wherein one of the tunnel portions is the tunnel portion of any of the aforementioned embodiments.

Embodiment 13

A tunnel including two or more tunnel portions connected together, and at least one of the two or more tunnel portions is a tunnel portion according to any of embodiments 1-12.

Embodiment 14

A play set, comprising:
a tunnel including a tunnel portion according to any of embodiments 1-11; and
a one or more of swing, platform, rope course, slide, awning, fireman pole, observation tower, or support frame.

Embodiment 15

The play set as recited in embodiment 14, wherein at least part of the play set is in a disassembled state.

Embodiment 16

The tunnel portion as recited in any of embodiments 1-15, wherein the tunnel portion includes one or more windows, and one of the windows includes grill pieces that impart a lattice configuration to the window.

Although this disclosure has been described in terms of certain example embodiments, other embodiments apparent to those of ordinary skill in the art are also within the scope of this disclosure.

What is claimed is:

1. A tunnel portion, comprising:
an elongate body having a first end and a second end that are configured to be connected together, and the elongate body including a first side and a second side;
first and second hollow segments located on the first side of the elongate body, and the first and second hollow segments are integral with the elongate body; and
a living hinge integral with the elongate body and located in a gap between the first hollow segment and the second hollow segment, and the elongate body extends continuously through the gap between the first hollow segment and the second hollow segment, and
wherein the elongate body is configured to alternatively assume a flat state, and an assembled state, and in the assembled state, the first end of the elongate body is connected with the second end of the elongate body.

2. The tunnel portion as recited in claim 1, wherein the tunnel portion is in the form of a unified, single piece structure made of plastic.

3. The tunnel portion as recited in claim 1, wherein the living hinge extends along a majority of a width of the elongate body.

4. The tunnel portion as recited in claim 1, wherein the elongate body has first and second edges extending lengthwise, and one or both of the first and second edges is configured to connect to a corresponding edge of another tunnel portion.

5. The tunnel portion as recited in claim 1, wherein the elongate body further comprises one or more additional hollow segments that are integral with the elongate body.

6. The tunnel portion as recited in claim 1, wherein an interior of the first hollow segment communicates with an interior of the second hollow segment.

7. The tunnel portion as recited in claim 1, further comprising an additional hollow segment located on the second side of the elongate body, and the additional hollow segment is integral with the elongate body.

8. The tunnel portion as recited in claim 7, wherein one or both of the first hollow segment and the second hollow segment extend across a majority of a width of the elongate body.

9. A package comprising two or more tunnel portions each in a flat state and stacked on top of each other or side-by-side on edge, wherein one of the tunnel portions is the tunnel portion as recited in claim 1.

10. The tunnel portion as recited in claim 1, wherein the elongate body further comprises one or more additional living hinges that are integral with the elongate body.

11. The tunnel portion as recited in claim 1, wherein in the assembled state, the tunnel portion has a circular configuration.

12. The tunnel portion as recited in claim 1, wherein in the assembled state, the tunnel portion has a non-circular configuration.

13. The tunnel portion as recited in claim 1, wherein the elongate body comprises a plurality of individual pieces that are connectible, or connected, together, and the living hinge is integral with a first one of the individual pieces.

14. The tunnel portion as recited in claim 13, wherein one or more of the individual pieces is in the form of a respective unified, single piece structure.

15. The tunnel portion as recited in claim 13, wherein one of the individual pieces includes the first end of the elongate body, and another of the individual pieces includes the second end of the elongate body.

16. The tunnel portion as recited in claim 13, wherein the individual pieces are connectible, or connected, to each other by way of respective integral structures of the individual pieces.

17. The tunnel portion as recited in claim 13, wherein one or more of the individual pieces comprises, respectively, one or more living hinges, and one or more hollow segments.

18. The tunnel portion as recited in claim 13, wherein the living hinge is solid and has a thickness that is relatively less than a thickness of one of the hollow segments.

19. The tunnel portion as recited in claim 13, wherein one or more of the individual pieces defines one or more unobstructed openings.

20. The tunnel portion as recited in claim 13, wherein when the elongate body is in the assembled state, the first and second hollow segments are located on an exterior of the tunnel portion.

21. The tunnel portion as recited in claim 13, wherein the individual pieces are connectible, or connected, together to define a portion of a circumference of the elongate body.

* * * * *